(12) United States Patent
Siganos

(10) Patent No.: US 11,492,083 B2
(45) Date of Patent: *Nov. 8, 2022

(54) APPARATUS AND COMPUTER IMPLEMENTED METHOD IN MARINE VESSEL DATA SYSTEM FOR TRAINING NEURAL NETWORK

(71) Applicant: Wärtsilä Finland Oy, Vaasa (FI)

(72) Inventor: Athanasios Siganos, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 268 days.

This patent is subject to a terminal disclaimer.

(21) Appl. No.: 16/899,713

(22) Filed: Jun. 12, 2020

(65) Prior Publication Data
US 2021/0387706 A1 Dec. 16, 2021

(51) Int. Cl.
*B63B 79/20* (2020.01)
*G06K 9/62* (2022.01)
*G06N 3/08* (2006.01)
*G06F 17/14* (2006.01)
*B63B 79/10* (2020.01)

(52) U.S. Cl.
CPC ............. *B63B 79/20* (2020.01); *B63B 79/10* (2020.01); *G06F 17/142* (2013.01); *G06K 9/6256* (2013.01); *G06K 9/6298* (2013.01); *G06N 3/08* (2013.01); *B63B 2203/00* (2013.01); *B63B 2211/00* (2013.01)

(58) Field of Classification Search
CPC ..... B63B 79/20; B63B 79/10; B63B 2203/00; B63B 2211/00; G06F 17/142; G06K 9/6256; G06K 9/6298; G06N 3/08

USPC .......................................................... 701/21
See application file for complete search history.

(56) References Cited

U.S. PATENT DOCUMENTS

| 2013/0340512 A1* | 12/2013 | Horlbeck | G01M 15/12 73/114.02 |
|---|---|---|---|
| 2020/0293828 A1* | 9/2020 | Wang | G06T 7/11 |
| 2021/0247534 A1* | 8/2021 | Bø | G01V 1/302 |

* cited by examiner

*Primary Examiner* — Allen C Wong
(74) *Attorney, Agent, or Firm* — Ziegler IP Law Group, LLC

(57) ABSTRACT

A computer implemented method and apparatus for a marine vessel data system, the method comprising: receiving data from at least one sensor configured to measure vibration and operationally arranged to the marine vessel to provide time-domain reference sensor data; maintaining the time-domain reference sensor data within a data storage system; generating a Fast Fourier Transform (FFT) on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data; normalizing each reference spectra file by converting the frequency information to order information using the condition information to provide normalized reference spectra files; and training a convolutional autoencoder type of neural network using the normalized reference spectra files.

20 Claims, 12 Drawing Sheets

APPARATUS AND COMPUTER IMPLEMENTED METHOD IN MARINE VESSEL DATA SYSTEM FOR TRAINING NEURAL NETWORK

TECHNICAL FIELD

The present application generally relates to an apparatus, method and software code for analysing a sensor originated vibration data and for training a neural network in marine vessel data system.

BRIEF DESCRIPTION OF RELATED DEVELOPMENTS

This section illustrates useful background information without admission of any technique described herein representative of the state of the art.

Modern vehicles, such as marine vessels, face different kinds of efficiency and performance requirements that are becoming increasingly more stringent. New legislation in the United States and European Union within the past few years has set, for example, fuel economy and emissions targets not readily achievable with prior known vehicle and fuel technology.

To address these increasing standards, marine vessel equipment manufacturers are demanding better performance.

Anomaly detection is an important topic that has been studied within diverse research areas and application domains. It refers to the problem of finding patterns in data that do not conform to expected behaviour. In Data Mining (DM), anomaly detection refers to the identification of rare items and observations, which raise suspicion by showing a significant difference from the majority of the data. The anomalies translate to some kind of problem such as errors in media, weather predictions, broken devices etc. Detecting anomalies proves effective in a wide variety of applications such as fraud detection for credit cards, insurance, intrusion detection for cyber-security, military surveillance of enemy activities and machinery maintenance.

This topic is often referred to as condition monitoring. Any machine, whether it is a rotating equipment (a pump, a compressor, a turbine, etc.) or a non-rotating (a distillation column, a valve, etc.) will eventually reach a condition of poor health. That condition does not necessarily have to be an actual failure or shutdown, but a condition in which the equipment is no longer performing at its optimal state. This indicates that there is a need for maintenance activity, to restore the full operating potential of the equipment.

The domain of condition monitoring primarily refers to identifying the health status of the equipment and its performance status. A common way to perform condition monitoring is to observe the installed sensor measurements, from the machine, and to impose limits on it. If the current values are within the normal bounds it is considered healthy. However, if the current values are outside the bounds, then the machine is deemed unhealthy and an alarm is sent to the monitoring system. The experts investigate the alarm and proceed with the necessary actions to repair the faulty machinery. However, methods like this have been proven to be rather inflexible since most machines need different bounds after significant time of usage. Engines, motors, propellers and similar instruments experience different amounts of operation, ensuing multiple years of deployment. It is common for engine experts to take into consideration the amount of usage each part has, in order to accurately evaluate the condition the machine is in. Evidently, having constant limits for alarms is not a dynamic solution for the problem of anomaly detection.

It is known from the prior art, for example, to provide an arrangement for taking a signal sample e.g. from an internal combustion engine and set threshold limits for pre-defined signal samples for triggering anomalies.

However, receiving a vast number of signals from a single system with a plurality of operationally interconnected elements, and setting thresholds or triggers for certain data samples during system operation is unreliable, cumbersome, difficult and requires more complexity, Due to even more stringent demands on efficiency and operational reliability, a need has emerged to improve the possibilities of tracking the operation of a marine vessel system by processing gathered data to detect anomalies.

Thus, an easy to set-up, accurate, and highly functional and reliable solution is needed to provide more accurate system for detecting anomalies in marine vessel environment, especially for propulsion systems.

SUMMARY

According to a first example aspect of the disclosed embodiments there is provided a computer implemented method in a marine vessel data system, the method comprising:

receiving data from at least one sensor configured to measure vibration and operationally arranged to the marine vessel to provide time-domain reference sensor data;

maintaining the time-domain reference sensor data within a data storage system;

generating a Fast Fourier Transform (FFT) on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data;

normalizing each reference spectra file by converting the frequency information to order information using the condition information to provide normalized reference spectra files; and training a convolutional autoencoder type of neural network using the normalized reference spectra files.

In an embodiment, the at least one sensor is configured to measure vibration of a component installed to the marine vessel.

In an embodiment, the at least one sensor comprises an accelerometer.

In an embodiment, the at least one sensor is configured to measure vibration of a propulsion system comprising a plurality of operationally connected parts.

In an embodiment, the condition information comprises rotations per minute (RPM) information.

In an embodiment, the spectra data comprises data points configured to determine the amplitude information as a function of the frequency information or the order information.

In an embodiment, each data point is associated with the condition information according to the condition information associated to the spectra file.

In an embodiment, the method further comprises:

resampling at least one normalized reference spectra file by interpolating the spectra data to a sub-range of the order information to provide resampled reference spectra file; and training the convolutional autoencoder type of neural network based on the resampled reference spectra file.

In an embodiment, the resampled reference spectra file comprises resampled data points with total number smaller than data points before resampling.

In an embodiment, resampling rate is configured to be three data points for a range of 0.1 order information.

In an embodiment, the spectra data is limited to first 50 orders as the sub-range of the order information, and interpolating is configured to determine 1600 data points.

In an embodiment; the method further comprises:
scaling at least one normalized reference spectra file by scaling the spectra data to a sub-range of the amplitude information to provide scaled reference spectra file; and
training the convolutional autoencoder type of neural network based on the scaled reference spectra file.

In an embodiment, the sub-range of the amplitude information is configured to be [0, 1].

In an embodiment, the convolutional autoencoder type of neural network is arranged at a remote server apparatus.

In an embodiment, the neural network is trained by means of signals from at least one sensor for determining internal neural network parameters.

In an embodiment, the training is configured to utilize a training function that comprises at least one of the following:
Gradient descent function;
Newton's method function;
Conjugate gradient function;
Quasi-Newton method function; and
Levenberg-Marquardt function.

In an embodiment, the method further comprises:
receiving remote normalized reference spectra files originating from a remote marine vessel apparatus; and
training the convolutional autoencoder type of neural network using the remote normalized reference spectra files.

In an embodiment, the method further comprises;
receiving data from a plurality of sensors configured to measure vibration and operationally arranged to the marine vessel to provide time-domain reference sensor data;
maintaining the time-domain reference sensor data within a data storage system;
generating a Fast Fourier Transform (FFT) on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data;
normalizing each reference spectra file by converting the frequency information to order information using the condition information to provide normalized reference spectra files; and
training a convolutional autoencoder type of neural network using the normalized reference spectra files.

According to a second example aspect of the disclosed embodiments there is provided a server apparatus in a marine vessel data system, comprising:
a communication interface;
at least one processor; and
at least one memory including computer program code;
the at least one memory and the computer program code configured to, with the at least one processor, cause the apparatus to:
receive data from at least one sensor configured to measure vibration and operationally arranged to the marine vessel to provide time-domain reference sensor data;
maintain the time-domain reference sensor data within a data storage system;
generate a Fast Fourier Transform (FFT) on the time-domain reference sensor data to provide a plurality of reference spectra files in frequency-domain, wherein each reference spectra file comprises spectra data defined by amplitude information and frequency information, and the spectra file is associated with condition information determined based on collection of the time-domain reference sensor data;
normalize each reference spectra file by converting the frequency information to order information using the condition information to provide normalized reference spectra files; and
train a convolutional autoencoder type of neural network using the normalized reference spectra files.

According to a third example aspect of the disclosed embodiments there is provided a computer program embodied on a computer readable medium comprising computer executable program code, which code, when executed by at least one processor of an apparatus, causes the apparatus to:
receive data from at least one sensor configured to measure vibration and operationally arranged to the marine vessel to provide time-domain reference sensor data:
maintain the time-domain reference sensor data within a data storage system;
generate a Fast Fourier Transform (FFT) on the time-domain reference sensor data to provide a plurality of reference spectra files in frequency-domain, wherein each reference spectra file comprises spectra data defined by amplitude information and frequency information, and the spectra file is associated with condition information determined based on collection of the time-domain reference sensor data;
normalize each reference spectra file by converting the frequency information to order information using the condition information to provide normalized reference spectra files; and
train a convolutional autoencoder type of neural network using the normalized reference spectra files.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only; with reference to the accompanying drawings; in which.

DETAILED DESCRIPTION

In the following description, like numbers denote like elements.

Figure 1:
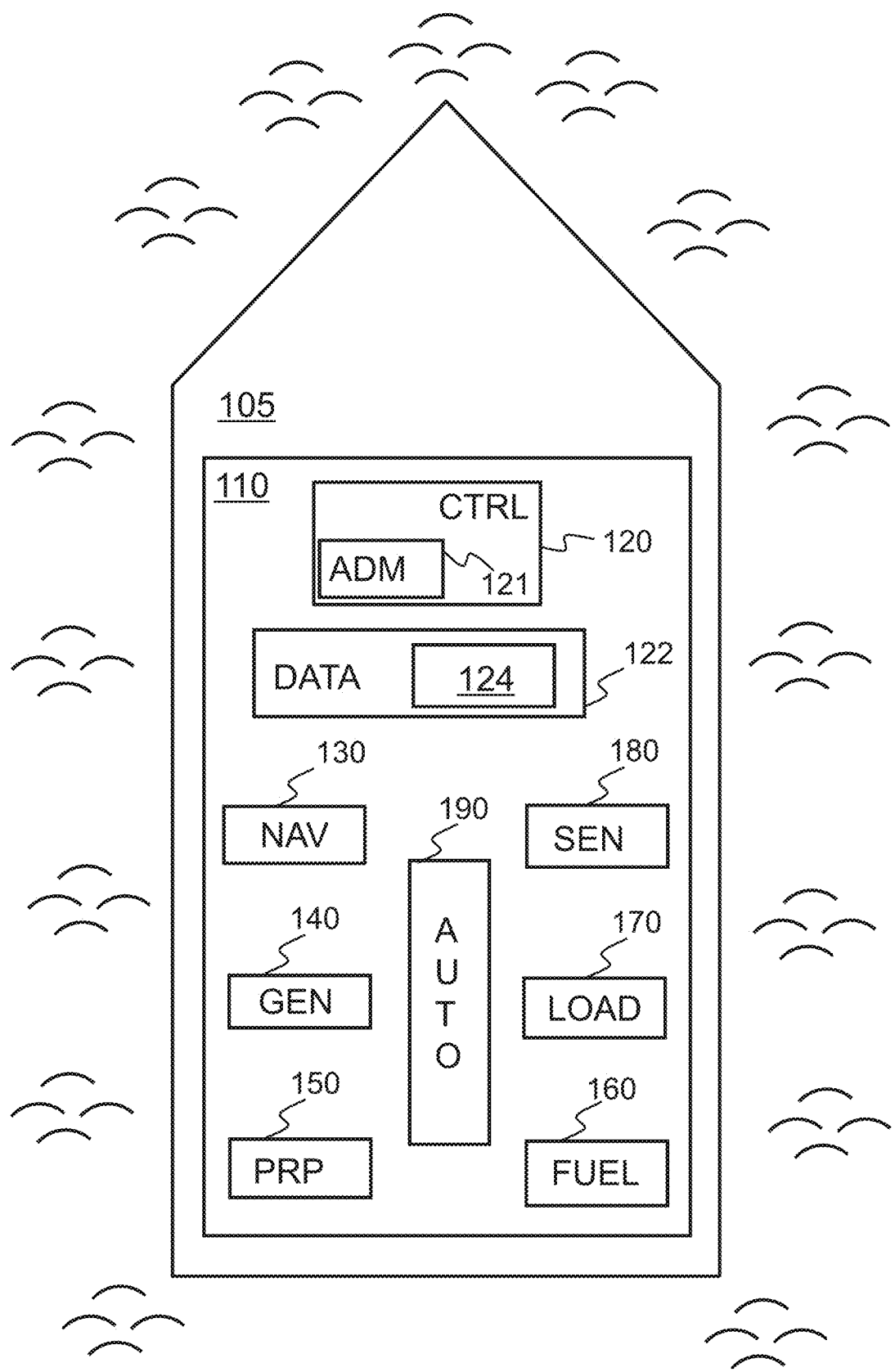
FIG. 1 shows a schematic picture of a marine vessel and a marine vessel data system according to an example embodiment.

FIG. 1 shows a schematic picture of a marine vessel 105 and a marine vessel data system 110 according to an example embodiment.

The marine vessel data system 110 comprises a control apparatus 120 configured to provide and operate an anomaly detection model (ADM) 121 or at least part of the operations needed for the anomaly detection model (ADM) 121, such as providing sensor data from the marine vessel data system 100 to a remote server apparatus where the anomaly detection model (ADM) is configured to be maintained and operated.

When operating a marine vessel with at least one sensor configured to measure plurality of operationally connected parts in the marine vessel system 110, data 122 is generated. Data 122 may be received from the plurality of sensors operationally arranged to the marine vessel 105 to provide sensor data 124, The sensor data 124 may be maintained within a data storage system. The data 122 may also comprise data from various data sources within the marine vessel data system 110, such as computer systems or communication systems, for example.

The dynamic anomaly detection model (ADM) 121 may be maintained and operated by the control apparatus 120 and receives data 122 as input. Further inputs may be provided from various data sources, internal or external, as well as operational or environmental, as discussed throughout the description. Alternatively, the dynamic anomaly detection model (ADM) may be maintained and operated by a remote server apparatus and receive input data 122 from the control apparatus 120. In such scenario the ADM 121 illustrated in FIG. 1 may be the plain data collection point or collection unit to provide the data to the remote server apparatus for the actual anomaly detection model (ADM).

In an embodiment, the anomaly detection model 121 utilizes a neural network to predict signal behavior of equipment within the marine vessel 105 with the goal of detecting abnormal behavior within the marine vessel data system 110.

In an embodiment, by establishing an extended interface between the ADM model 121 (or data collection unit in case the ADM model is operated at remote server apparatus) and other systems like the navigation system 130, automation system 190, power generation system 140, propulsion system 150, fuel system 160, energy load system 170 and auxiliary sensor system 180, for example, it is possible to gather vast amount of complex input data for ADM 121 to process, learn, predict and detect anomalities.

The power generation system 140 may comprise different power generation sources, such as engines operating with diesel oil, LNG, LPG, synthetic fuels or like. Propulsion system 150 may be configured to change the propulsion energy source (e.g. electric motor powering the propulsion wherein the energy source for the energy motor is changed), or for activating exhaust gas cleaning system (e.g. scrubber and/or SCR), for example. By establishing an ADM 121 (or data collection unit or point for the remote ADM) for communicating between systems 120-190 it is possible to use artificial neural networks as computing systems. The neural network within the ADM 121 itself may not be a single algorithm but a framework for many different machine learning algorithms to work together and process complex data inputs. Such systems learn to perform tasks by considering a lot of examples.

The neural network of the ADM 121 is configured to learn to reconstruct each data signal of the data 122 from an equipment of the system 110, based on all other data signals of the data 122.

Based on the difference between the reconstruction of a data signal and the actual signal, abnormal sensor behavior can be detected, as discussed in the description.

Uniqueness of the embodiments are based on the fact that, in general, the approach to anomaly detection is different. Essential feature is to use a neural network within the ADM 121 to reconstruct (historical) data of the data 122 and compare it to actual data of the data 122 with the goal of detecting deviations (abnormal, anomalous behavior) in the marine vessel 105. This will be discussed more in relation to following figures and associated description.

In an embodiment, for the marine vessel 105 related anomaly detection, top priority for detection may be defined to be safety, and second and third priority can be set by the ship operator (fuel consumption, speed/time, etc.), for example. The ADM 121 operates as a virtual expert for providing insight on anomalies.

The fuel system 160 may be configured to select from at least one of the following energy sources: diesel, liquified natural gas (LNG), liquified petroleum gas (LPG), methanol, low sulphur heavy fuel oil (HFO), marine gas oil (MGO), and hydrogen, for example.

Propulsion system 150 may utilize power source to be selected from at least one of the following: combustion-engine based power source; hybrid power source; and full electric power source. The propulsion system 150 may comprise at least one thruster unit. Sensor data may be received from a plurality of sensors arranged to different parts of the propulsion system 150. A sensor may be operationally connected to a shaft of the propulsion system 150, and another sensor may be operationally connected to a blade of thruster unit, for example. Thus time-domain vibration data may be received from different parts of the propulsion system 150.

The ADM 121 solution will allow different levels of automation within vessels. In first operation mode, ADM 121 may be configured to provide an anomaly detection plan, which the engineers can use for scheduling their activities. In second operation mode, ADM 121 may be configured to provide an embedded solution, wherein the sub-systems can notify the operator based on the anomaly detection plan, when to perform certain tasks or be switched on or set to standby. This notification may be repeated on the main display in the engine control room or remote-control station. In third operation mode, ADM 121 may be configured to provide a solution to be fully automated and automatically executing the anomaly detection plan of the ADM 121 with merely notification provided to the operator or remote-control station when performing different automated tasks.

Furthermore, characteristic information representing at least one operating characteristic of the marine vessel 105 may be received as data 122. The dynamic ADM 121 may use any available internal or external data such as weather forecasts and route plan information, and the vessel related data including the characteristic information.

In an embodiment, the anomality detection model 121 may be configured to perform a computer implemented method in a marine vessel data system, the method comprising: receiving data from at least one sensor configured to measure vibration and operationally arranged to the marine vessel to provide time-domain reference sensor data; maintaining the time-domain reference sensor data within a data storage system; generating a Fast Fourier Transform (FFT) on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data; normalizing each reference spectra file by converting the frequency information to order information using the condition information to provide normalized reference spectra files; and training a convolutional autoencoder type of neural network using the normalized reference spectra files.

In an embodiment, the at least one sensor is configured to measure vibration of a component installed to the marine vessel. The at least one sensor may comprise an accelerometer.

In an embodiment, the at least one sensor is configured to measure vibration of a propulsion system comprising a plurality of operationally connected parts.

In an embodiment, the condition information may comprise rotations per minute (RPM) information.

In an embodiment, the spectra data comprises data points configured to determine the amplitude information as a function of the frequency information or the order information. Each data point may be associated with the condition information according to the condition information associated to the spectra file.

Figure 2:
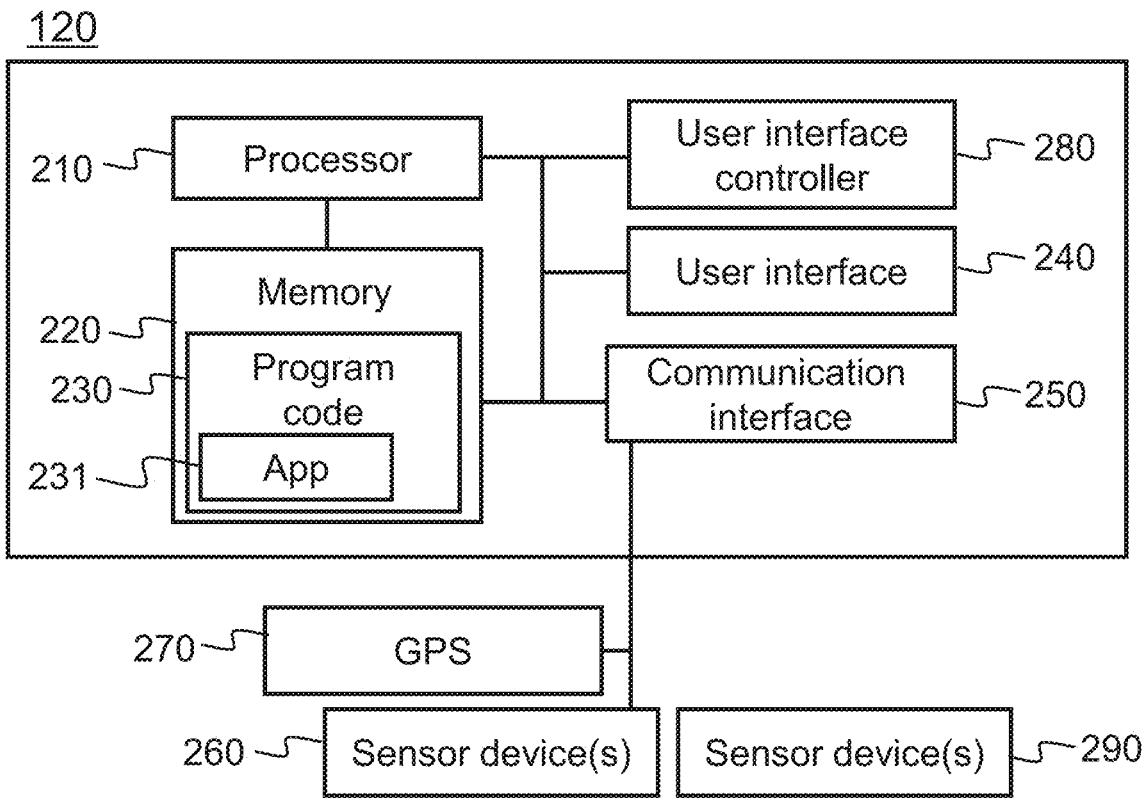
FIG. 2 presents an example block diagram of a control apparatus within a marine vessel, for example, in which various embodiments of the invention may be applied.

FIG. 2 presents an example block diagram of a control apparatus 120 within a marine vessel, for example, in which various embodiments of the invention may be applied.

The general structure of the apparatus 120 comprises also devices such as GPS 270 and at least one sensor 260.

The general structure of the control apparatus 120 may comprise a user interface 240, a communication interface 250, a satellite positioning device (GPS) 270, capturing/sensor device(s) 260 for capturing vibration data, current activity data and/or current environmental data relating to the vessel, a processor 210, and a memory 220 coupled to the processor 210. The control apparatus 120 further comprises software 230 stored in the memory 220 and operable to be loaded into and executed in the processor 210. The software 230 may comprise one or more software modules and can be in the form of a computer program product. The control apparatus 120 may further comprise a user interface controller 280.

The processor 210 may be, e.g., a central processing unit (CPU), a microprocessor, a digital signal processor (DSP), a graphics processing unit, or the like. FIG. 2 shows one processor 210, but the apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 120 may comprise a plurality of memories. The memory 220 may be constructed as a part of the apparatus 120 or it may be inserted into a slot, port, or the like of the apparatus 120 by a user. The memory 220 may serve the sole purpose of storing data, or it may be constructed as a part of an apparatus serving other purposes, such as processing data. A proprietary anomaly detection application (client application) 231 comprising the anomaly detection model ADM 121 (or ADM data collection point in case the ADM is arranged remotely at server apparatus) is stored at the memory 220. Propulsion system data, engine data, vibration data, sensor data and environmental data may also be stored to the memory 220. The program code 230 may comprise the dynamic anomaly detection model (ADM) 121 and the proprietary application 231 may comprise a client application for the ADM, for example.

The user interface controller 280 may comprise circuitry for receiving input from a user of the apparatus 120, e.g., via a keyboard, graphical user interface shown on the display of the user interfaces 240 of the control apparatus 120, speech recognition circuitry, or an accessory device, such as a headset, and for providing output to the user via, e.g., a graphical user interface or a loudspeaker.

The satellite positioning device 270 is configured to provide location information or time information, for example. Such information may comprise, for example, position coordinates, speed, direction of movement, GPS time, and altitude information.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution), or 5G radio module. The wired interface may comprise such as universal serial bus (USB) or National Marine Electronics Association (NMEA) 0183/2000 standard for example. The communication interface module 250 may be integrated into the apparatus 120, or into an adapter, card or the like that may be inserted into a suitable slot or port of the apparatus 120. The communication interface module 250 may support one radio interface technology or a plurality of technologies. The apparatus 120 may comprise a plurality of communication interface modules 250.

A skilled person appreciates that in addition to the elements shown in FIG. 2, the apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 120 may comprise a disposable or rechargeable battery (not shown) for powering when external power if external power supply is not available.

In an embodiment, the apparatus 120 comprises speech recognition means. Using these means, a pre-defined phrase may be recognized from the speech and translated into control information for the apparatus 120, for example.

The satellite positioning device 270 and the sensor device(s) 260 may be configured to be comprised by the apparatus 120 or connected as separate devices to the apparatus 120. In case the satellite positioning device 270 and the capturing device 260 are comprised in the apparatus 120 they may be connected to the apparatus 120 using an internal bus of the apparatus 120. In case the satellite positioning device 270 and the sensor device 260 are external devices connected to the apparatus 120 they may be connected to the apparatus 120 using communication interface 250 of the apparatus 120 or using the internal bus.

The sensor device(s) 260 may be configured to, for example, measure vibration data, propulsion performance or operational data.

In an embodiment, at least one sensor device(s) 290 may be configured not to be integrated to the marine vessel's information system 200 but connected to the propulsion system 150 (see FIG. 1) only.

In an embodiment, sensor device(s) 290 are configured to be integrated to the propulsion system 150. No matter a single sensor 290 is shown, the sensor 290 may comprise a plurality of sensors 290. The sensor devices 290 may be configured to, for example, measure vibration data, propulsion performance or operational data.

In an embodiment, a communication interface (see e.g., FIG. 3) of the sensor device 290 comprises an automatic identification system (AIS) receiver for receiving a wireless transmission comprising automatic identification system data, e.g. from the marine vessel. The AIS receiver may include an antenna configured to receive the automatic identification system data or the sensor device 290 may include an antenna configured to receive the automatic identification system data. In another example, AIS receiver is configured to receive the automatic identification system data from an antenna external to the sensor device 290.

In an embodiment, the propulsion system 150 and at least one sensor device 290 is configured to generate sensor data items based on the received automatic identification system data and sensor data. The sensor data item may thus comprise sensor data generated by the sensor device 290 and an identifier information. The identifier information may comprise at least one of the following: sensor-ID (S-ID): propulsion-ID (P-ID), and vessel-ID (V-ID) that comprises at least part of the received automatic identification system data.

The sensor data item may also comprise information identifying the marine vessel (for example, International Maritime Organization (IMO) ship identification number or Maritime Mobile Service Identity (MMSI)). This identifying information may be taken from the automatic identification system (AIS) signal or it may be stored within the apparatus 120 when installed.

The sensor data relating to the propulsion system and vibration measured by the at least one sensor device 260, 290 may comprise measured data values as they were measured and/or data after processing at least some of the measured data values first.

In an embodiment, universal clock information of the control unit 200 is determined based on a vessel receiver device, comprising at least one of the Global Positioning System (GPS) receiver 270 and a communication interface 250 of the marine vessel. The universal clock information may comprise at least one of the following: a Global Positioning System (GPS) time and a Coordinated Universal Time (UTC).

In an embodiment, a proprietary anomaly detection application (client application) 231 is maintained at the apparatus 120. The application 231 may comprise the ADM model 231 or the ADM model related data, such as anomaly detection data that is received from the server apparatus where the ADM model is run, for example. Anomalies are then determined using the ADM model 230, 231 (item 121 in FIG. 1) at control apparatus or at remote server apparatus if the ADM model is located there using the input data.

No matter a plurality of elements is shown; all elements are not essential for all embodiments. Some elements are optional, such as GPS 270, sensor device 290, user interface 240 and user interface controller 280.

Figure 3:
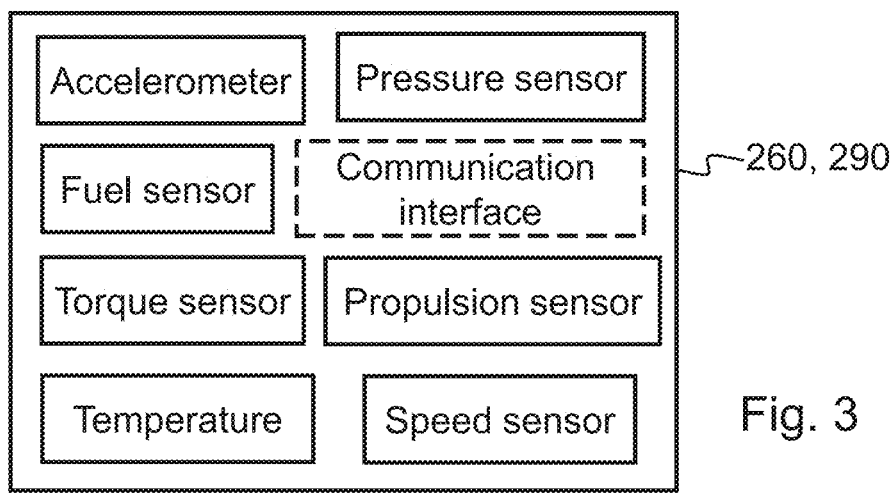
FIG. 3 presents an example block diagram of a sensor device in which various embodiments of the invention may be applied.

FIG. 3 presents an example block diagram of a sensor device 260, 290 in which various embodiments of the invention may be applied. The sensor device 260, 290 may comprise various means for vibration data detection, activity data detection, operational data detection and environmental data detection, for example. The sensor device 260, 290 may be used propulsion system related data capturing or environmental data capturing.

In an embodiment, the sensor device 260, 290 and the processing of the sensor data may provide a plurality of parameters relating to a propulsion system, for example one or more of the following: magnitude and direction of proper acceleration; orientation, coordinate acceleration, shock, time, position, vibrations in three dimensions, and propeller/engine RPM, for example. The operation conditions of the propulsion system may comprise at least one of the following: number of starts; operating hours since last service; load cycles; miles traveled with the propulsion system; amount of fuel used; and integral sensor data of the engine to provide engine sensor data, such as temperature information, pressure information and mass flow information, for example.

The sensor device 260, 290 may also comprise several capturing devices, combinations of any above-mentioned devices, and the like. The environmental temperature may comprise air temperature, water temperature or ground surface temperature, for example.

The sensor device 260, 290 may comprise also a communication interface capable of connecting with the communication interface 250 of FIG. 2. The generated sensor data may be transmitted to the communication interface of FIG. 2. The sensor device 260, 290 may also transmit its sensor data via its internal communication interface to the communication interface 250.

In an embodiment, the communication interface within the sensor device 260, 290 is, for example, a wireless transmitter or a wireless transceiver (for example; Wireless Local Area Network (WLAN) transceiver or any mobile or cellular communication network transceiver (for example, Wideband Code Division Multiple Access (WCDMA), Long Term Evolution (LTE) etc.), 5G or a local data port (e.g. Ethernet, Universal Serial Bus (USB) etc.).

In an embodiment, the sensor device 260, 290 may also store information identifying the propulsion system or the marine vessel. This may have been preconfigured to the sensor device 260, 290. Since the automatic identification system data identifies e.g. the marine vessel to which the received data relates to, the sensor device 260, 290 is thus able to make sure that the received automatic identification system data relates to the marine vessel to which the sensor device 260, 290 is affixed. One possibility for identifying the correct marine vessel is to use, for example, wireless signal strength of the AIS signal. The strongest AIS signal relates to the marine vessel to which the sensor device 260, 290 is attached. Yet another possibility is to compare the acceleration signal from the acceleration sensor to the data indicating vessel movements in the AIS signals and to determine the correct AIS signal based on the comparison.

In an embodiment, a sensor device 260, 290 is configured to measure the marine vessel performance related data when the sensor device 260, 290 is affixed to the hull structure of the marine vessel 105 of FIG. 1. For example, bolting, gluing or any other way for affixing or attaching the sensor device 260, 290 to the hull structure, propulsion element or engine body may be used. In other words, since the sensor device 260, 290 is firmly attached to the hull, propulsion or engine structure, there is no relative motion between the sensor device 260, 290 and the structure, and thus the sensor or sensors 260, 290 sense the motions and vibrations.

In an embodiment, an AIS receiver (comprised by the communication interface within the sensor device 260, 290 of FIG. 3) may receive a wireless transmission comprising an AIS signal from the same marine vessel to which the sensor device 260, 290 is affixed. The sensor device 260, 290 may beforehand store information identifying the marine vessel (for example, International Maritime Organization (IMO) ship identification number or Maritime Mobile Service Identity (MMSI)) so that it is able to determine that the AIS signal relates to the marine vessel 105 to which it is affixed. The AIS signal includes several pieces of information relating to the marine vessel, for example, the vessel's identity, engine(s) identifier(s) and type, position, course, speed, navigational status and other related information. The sensor device 260, 290 may utilize the AIS signal as it was received (in other words, every piece of information contained in the AIS signal). In another example, the sensor device 260, 290 may select a subset of information included in the AIS signal to be included in the sensor data. In one example, the subset includes at least position and/or time information of the marine vessel.

Normally the AIS signal is intended to assist a vessel's watch standing officers to track and monitor movements of other vessels and allow maritime authorities to track and monitor movements of vessels. It also identifies and locates vessels by electronically exchanging data with other nearby ships.

In an embodiment, the AIS signal is received by a sensor device 260, 290 installed in a vessel that is sending the AIS signal. This makes it possible for the sensor device to link the AIS signal with sensor data measured by the sensor or sensors 260, 290, Since the sensor device 260, 290 has the information included in the AIS signal and measurements from one or more sensors 260, 290, there is no need to make the traditional integration tasks to the marine vessel's information systems. The AIS signal sent by the marine vessel to the sensor device 260, 290 is a strong signal, Therefore, it may not be necessary to install a separate antenna in order to be able to receive the AIS signal. This makes the installation of the sensor device 260, 290 simpler and quicker. For example, it is possible to install the sensor device 260, 290 including only an internal antenna inside a marine vessel because the AIS signal leaks to the interior of the marine vessel via various existing cables, for example.

In an embodiment, a camera is configured to provide video signal as input data for the dynamic anomaly detection model (ADM) 121 (FIG. 1), 230 (FIG. 2). The camera may be regarded as sensor 260, 290 in relation to FIG. 2 or 3, Based on the video signal the apparatus may determine at least part of the environmental or operational data. The determination may be done by video image processing, pattern recognition, filtering or other such means, for example. Alternatively, or additionally, direct sensor data or online data (such as weather information) may be used.

The sensor device 260, 290 disclosed in FIGS. 2-3 may include at least one accelerometer or three-dimensional accelerometer. Since the sensor device 260, 290 may be affixed to the propulsion system, or the hull of the marine vessel or the engine body, the accelerometer is able to sense vibrations. From the vibrations sensed by the accelerometer, it is possible to determine, for example, speed of rotation of a propeller of the marine vessel or of the main engine. In most vessels, the speed of rotation of the propeller is identical with the speed of rotation of an engine of a marine vessel. Thus, it is possible to determine, based on an analysis of the measurements of the accelerometer, the speed of rotation of a propeller and an engine of a marine vessel.

In an embodiment, in order to determine the speed of rotation of the propeller, the sensor device 260, 290 or the associated computer device may analyze the signals measured by the accelerometer to identify the fundamental frequency in the signals. The fundamental frequency is the RPM (Revolutions Per Minute) of the engine or its multiple. One possible method for pitch detection (i.e. find the fundamental frequency) is the Harmonic Product Spectrum (HPS) method. In the method, a spectrum is compressed a number of times (down sampling), and it is compared with the original spectrum. It can then be seen that the strongest harmonic peaks line up. The first peak in the original spectrum coincides with the second peak in the spectrum compressed by a factor of two, which coincides with the third peak in the spectrum compressed by a factor of three. Hence, when the various spectrums are multiplied together, the result will form a clear peak at the fundamental frequency. It is obvious that the HPS is only one possible method for finding the fundamental frequency and other methods may be used. The speed of rotation of the propeller may also be stored in the memory of the sensor device 260, 290 to be transmitted to or accessed by an external entity. Related data may be used also as input for the dynamic anomaly detection model (ADM) 121.

Furthermore, device or apparatus analyzing the sensor data, such as a server apparatus, the sensor device itself, the control unit 200 or the remote apparatus may perform frequency analysis of the signals measured by at least one acceleration sensor of the sensor device 260, 290. In case the sensor device or some other device or apparatus performs the frequency analysis, the amount of sensor data to be transmitted outside the sensor device/computer device is reduced. The frequency analysis may comprise, for example, frequency-time analysis, such as Short-Time Fourier Transform (STFT) or Discrete Wavelet Transform (WFT). With the frequency analysis, an understanding of frequency components over a short time is received. The frequency analysis is performed, for example, so that parameters of a marine vessel 105 (see FIG. 1) can be understood better and analyzed.

Further, the frequency analysis may comprise applying a dimensionality reduction method, for example, Principal Component Analysis (PCA) in order to identify the most significant components in the frequency domain.

An accelerometer and an inclinometer can be used to measure the same parameters since both measure acceleration. One of the main differences is that the accelerometer provides acceleration components separately, but they are more inaccurate. However, acceleration components are usually provided within a larger dynamic range. The inclinometer measures inclination more accurately but within a narrower range. Therefore, it is possible to perform RPM measurements also with the inclinometer if its bandwidth is high enough. Further, it may be possible to perform a frequency analysis for the data provided by the inclinometer and get the same or almost the same results than based on accelerometer data. One difference, however, is that the inclinometer does not measure vertical acceleration.

Based on the analysis of the sensor data, it may be possible to determine the operation efficiency of the marine vessel (or the power plant, for example) and its engine and to automatically trigger service requests such as oil change for the engine 291, for example.

Based on the information available and generated by the sensor device 260, 290 it may be possible to optimize and analyze various factors relating to the marine vessel 105 (see FIG. 1), such as preventing unplanned downtime, extending maintenance interval, or improving energy efficiency of a marine vessel using the ADM model 230 (ADM 121 in FIG. 1).

In an embodiment, a method comprises receiving data from at least one sensor 260, 290 configured to measure vibration and operationally arranged to the marine vessel to provide time-domain reference sensor data; maintaining the time-domain reference sensor data within a data storage system; generating a Fast Fourier Transform (FFT) on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data; normalizing each reference spectra file by converting the frequency information to order information using the condition information to provide normalized reference spectra files; and training a convolutional autoencoder type of neural network using the normalized reference spectra files.

Based on input data and the trained ADM model (neural network based) it is possible to detect anomalies and further provide triggers for tasks or determine automated performance optimization, for example. Sensor detected vibration data may also be transmitted to the server apparatus and utilize the data and the model there for determining anomalies or triggering customer related services, such as calculation of optimized service time, for example.

Figure 4:
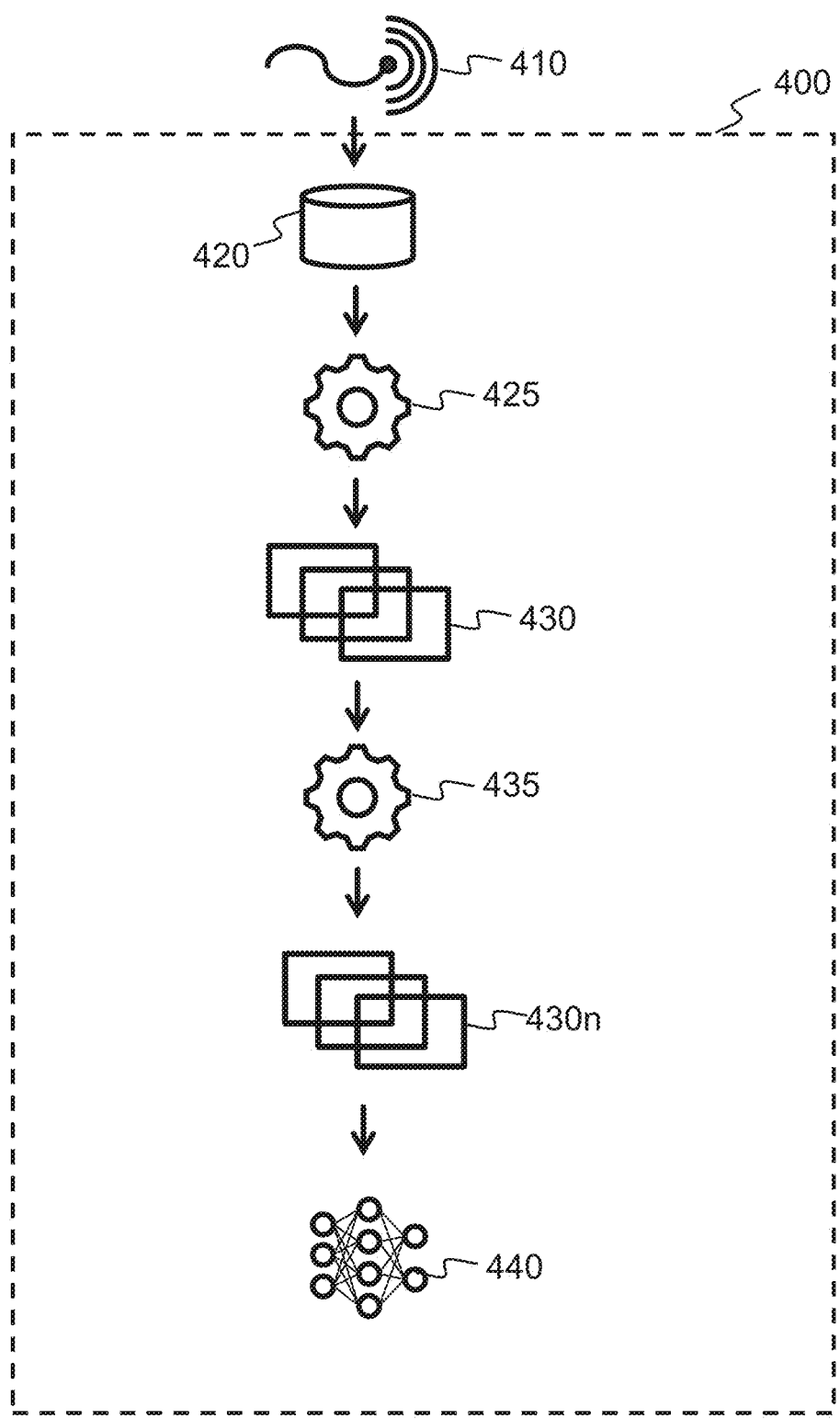
FIG. 4 shows a schematic picture of a computer implemented method and system for training a neural network based ADM model according to an example embodiment.

FIG. 4 shows a schematic picture of a computer implemented method and system for training a neural network based ADM model 400 according to an example embodiment. The trained ADM model 400 may also be used for generating anomaly information, such as 3D anomaly heatmap information. The anomaly detection model (ADM) 400 may be configured to be maintained at a remote server apparatus, at a remote control apparatus, at a marine vessel control apparatus or any combination of those. For example, data collection 410 may be arranged from one apparatus (e.g. marine vessel control apparatus), an insight input 495 from a second apparatus (e.g. remote control apparatus) and the actual data processing and neural network involvement at a third apparatus (e.g. remote server apparatus), for example.

First, data is received from at least one sensor 410 or from a plurality of sensors 410 configured to measure vibration and operationally arranged to a marine vessel to provide time-domain reference sensor data. The sensor 410 may be configured to provide also frequency-domain reference sensor data.

The time-domain reference sensor data (and/or the frequency-domain reference sensor data, see above) is maintained within a data storage system 420. For example, at least one sensor may be operationally arranged to a propulsion system of the marine vessel.

The data storage system 420 may be arranged to a remote server apparatus, such as cloud server, but may also be at least temporarily stored at marine vessel data storage. The maintained sensor data of the data storage system 420 is provided as source data for further processing.

Second, a Fast Fourier Transform (FFT) 425 is generated on the time-domain reference sensor data to provide a plurality of reference spectra files 430 in frequency-domain, wherein each reference spectra file 430 comprises spectra data defined by amplitude information and frequency information, and each spectra file is associated with condition information determined based on collection of the time-domain reference sensor data.

Third, each reference spectra file 430 may be normalized 435 by converting frequency information to order information using the condition information (RPM) to provide normalized reference spectra files 430$n$.

In an embodiment, normalization step 435 may comprise several sub-steps. For example, a first sub-step may comprise that instead of indicating the specific frequency it is more advantageous for vibration analysis to know the frequency relative to the input speed. To achieve this, frequencies are converted into orders. A second sub-step may comprise to limit on specific orders which correspond to parts of the thruster. For example, data of approximately the first 40-50 orders could be selected. A third sub-step may comprise interpolation, wherein if we take into consideration that the availability of data in a certain period can be low, To solve this complication data may be interpolated to a limited range of orders with an explicit number of new data points. The number of resampled data points can be made with respect to the desired precision for the analysis of the data. As an example, three data points for a range of 0.1 order could be used. These sub-steps are more detailly discussed in connection with FIG. 10c, for example.

Fourth, a convolutional autoencoder type of neural network 440 is trained using the normalized reference spectra files 430*n*.

Figure 5:
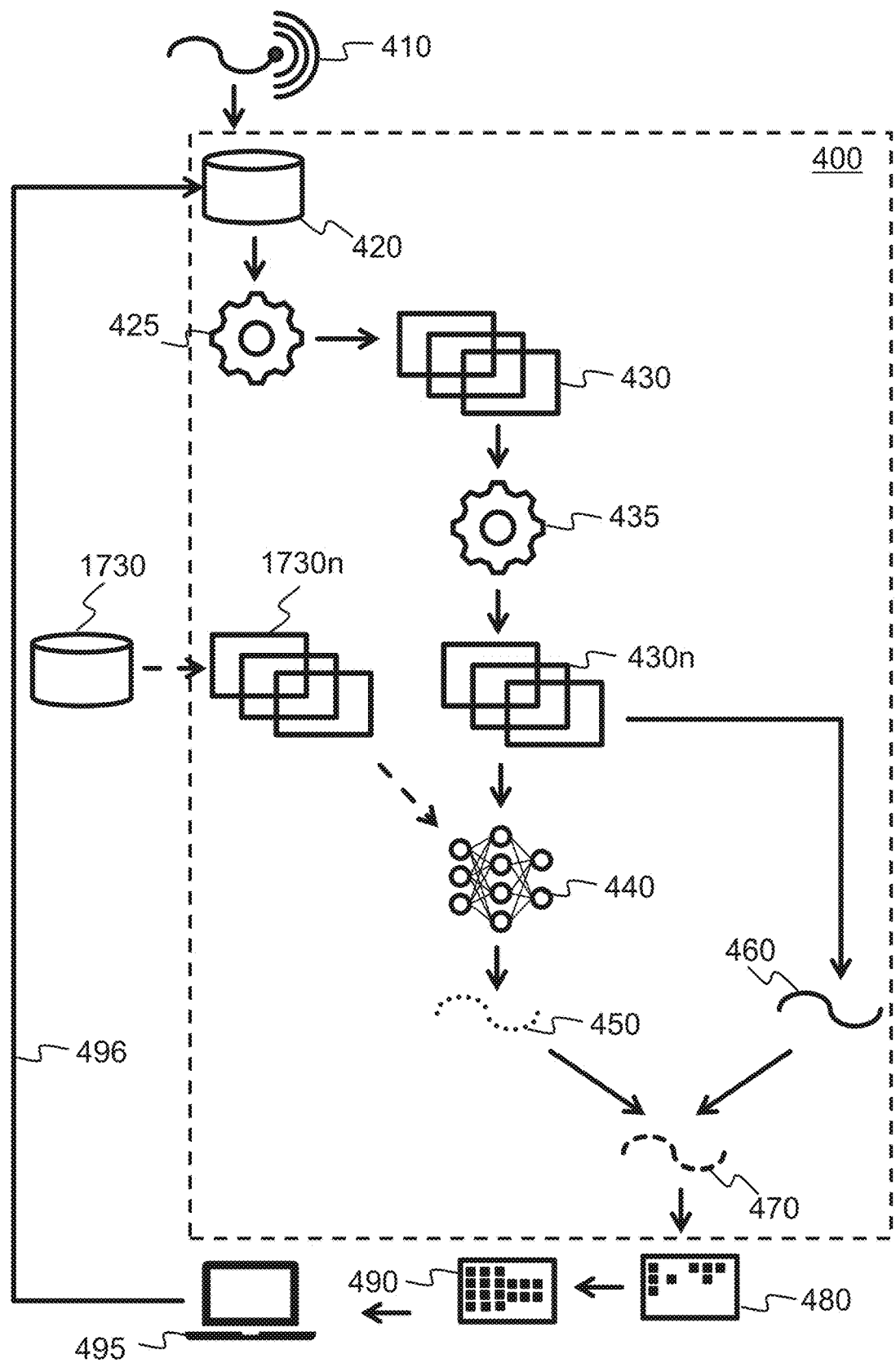
FIG. 5 shows a schematic picture of a computer implemented method and system for generating anomaly information using a neural network based ADM model according to an example embodiment.

FIG. 5 shows a schematic picture of a computer implemented method and system for generating anomaly information using a neural network based ADM model 400 according to an example embodiment.

The trained ADM model 400 may also be used for generating anomaly information, such as 3D anomaly heatmap information. The anomaly detection model (ADM) 400 may be configured to be maintained at a remote server apparatus, at a remote control apparatus, at a marine vessel control apparatus or any combination of those. For example, data collection 410 may be arranged from one apparatus (e.g. marine vessel control apparatus and the actual data processing and neural network involvement at another apparatus (e.g. remote server apparatus), for example.

First, data is received from a sensor 410 configured to measure vibration of a system comprising a plurality of operationally connected parts, and operationally arranged to the marine vessel to provide actual sensor data 460.

The actual sensor data 460 may be received via processing 425-430*n* directly from the sensor 410 without first maintaining at the data storage system 420 or first maintaining at storage 420 and then through processing 425-430*n*. The data storage system 420 may be used to maintain also reference sensor data used for training the model 400. The reference sensor data may be data collected for actual sensor data 460 received over time, and used as history data for training the model, for example.

Second, predicted data 450 is generated for the at least one sensor 410 as output by a convolutional autoencoder type of neural network 440, wherein the convolutional autoencoder type of neural network 440 is configured to be trained using normalized reference spectra files 430*n*, wherein each normalized reference spectra file 430*n* comprises spectra data defined by amplitude information and order information, and each spectra file is associated with timestamp information determined based on collection of the reference sensor data. Timestamp information may correlate to time information (year/month/date) when the sensor data was received by the sensor 410, either for reference data use to train the model or to be used as actual sensor data 460.

Third, the predicted data 450 is combined with the actual sensor data 460 for the sensor to provide error data 470.

Fourth, 3D anomaly heatmap information 480 is generated, wherein a first dimension is defined by the timestamp information, a second dimension is defined by the order information and a third dimension is defined by anomaly information determined based on the error data 470.

In an embodiment, consecutive spectra files 430-430*n* of the actual sensor data 460 may be detected in the first dimension with anomaly information in the third dimension, wherein the anomaly information exceeds pre-defined anomaly threshold, at least one detected spectra file may be determined to identify order information for the anomaly information, the identified order information may be compared with part frequencies of the plurality of operationally connected parts (that the sensor 410 is operationally connected to), and faulty part may be determined based on the comparison.

In an embodiment, order information may be identified with at least one harmonic for the anomaly information when determining the at least one detected spectra file, the identified order information may be compared with the at least one harmonic and the part frequencies of the plurality of operationally connected parts, and faulty part determined based on the comparison.

In an embodiment, anomalies may be detected in a sub-range of the second dimension based on the 3D anomaly heatmap information 480, and second 3D anomaly heatmap information 490 may be generated, wherein a first dimension is defined by the timestamp information, a second dimension is defined by the order information of the sub-range and a third dimension is defined by anomaly information determined based on the error data 470.

In an embodiment, false anomalies may be determined based on the second 3D anomaly heatmap information 490 by identifying order pole pass frequencies.

In an embodiment, at least one spectra file 430-430*n* of the actual sensor data 460 may be detected with anomaly information in the third dimension, wherein the anomaly information exceeds pre-defined anomaly threshold, order information may be determined for the anomaly information in the sub-range, the determined order information compared with order pole pass frequencies and part frequencies of the plurality of operationally connected parts, and faulty part determined based on the comparison. Order information relating to pole pass frequencies may be ignored when determining faulty part.

Error data 470 generation may be part of the ADM model 400 and 3D heatmap information 480 may also be generated by the model 400 no matter it illustrated as being generated outside the model 400.

In an embodiment, the sensor 410 is configured to measure vibration of a propulsion system comprising at least a shaft, a bearing, a propeller base and a propeller blade, and at least one of them having pre-defined part frequency provided for determining faulty part.

The condition information may comprise rotations per minute (RPM) information. Vibration data may be thus received through a single sensor measuring vibration relating to different parts of the propulsion system, such as a thruster.

In an embodiment, the convolutional autoencoder type of neural network 440 is arranged at a remote server apparatus and the sensor 410 or the plurality of sensors 410 are operationally arranged to an engine system or a propulsion system of the marine vessel. Generating the predicted data 450 may comprises reconstructing data of at least one sensor 410, by the neural network 440, based on the sensor data 420.

In an embodiment, for training the model, data is received from at least one sensor 410 configured to measure vibration and operationally arranged to a marine vessel to provide time-domain reference sensor data or frequency-domain reference sensor data, depending on the arrangement.

The time-domain reference sensor data or the frequency-domain reference sensor data is maintained within a data storage system 420. For example, a sensor may be operationally arranged to a propulsion system of the marine vessel, wherein the propulsion system comprises a plurality of operationally interconnected parts, like shaft, bearing, base and propeller blade, for example.

The data storage system 420 may be arranged to a remote server apparatus, such as cloud server, but may also be at least temporarily stored at marine vessel data storage. The maintained sensor data of the data storage system 420 is provided as source data for further processing.

A Fast Fourier Transform (FFT) 425 may be generated on the time-domain reference sensor data to provide a plurality of reference spectra files 430 in frequency-domain, wherein each reference spectra file 430 comprises spectra data defined by amplitude information and frequency information, and each spectra file is associated with condition information determined based on collection of the time-domain reference sensor data.

Each reference spectra file 430 may be normalized 435 by converting frequency information to order information using the condition information (RPM) to provide normalized reference spectra files 430n.

In an embodiment, normalization step 435 may comprise several sub-steps. For example, a first sub-step may comprise that instead of indicating the specific frequency it is more advantageous for vibration analysis to know the frequency relative to the input speed. To achieve this, frequencies are converted into orders. A second sub-step may comprise to limit on specific orders which correspond to parts of the thruster. For example, data of approximately the first 40-50 orders could be selected. A third sub-step may comprise interpolation, wherein if we take into consideration that the availability of data in a certain period can be low. To solve this complication data may be interpolated to a limited range of orders with an explicit number of new data points. The number of resampled data points can be made with respect to the desired precision for the analysis of the data. As an example, three data points for a range of 0.1 order could be used. These sub-steps are more detailly discussed in connection with FIG. 10c, for example.

A convolutional autoencoder type of neural network 440 may be trained using the normalized reference spectra files 430n.

Alternatively, other types of neural network 440 may be used, such as Denoising autoencoder, LSTM Autoencoder or Variational auto encoder, for example.

The predicted data 450 may be combined with actual sensor data 460 for the sensor or the subset of the plurality of sensors to provide error data 470, wherein the actual data 460 is processed based on sensor data received from a sensor 410 or is processed based on sensor data maintained at the data storage system 420 based on the sensor ID of the plurality of sensors.

Actual sensor data 460 may be processed in corresponding way from the sensor 410 through steps 420-430n all the way to be combined to provide error data 470.

In an embodiment, generating the predicted data 450 comprises determining correlation, by the neural network 440, between the data from the plurality of sensors 410. Correlation may be determined, by the neural network 440, for the sensor 410 or the subset of the plurality of sensors 410.

In an embodiment, the neural network 440 is trained by means of signals from the individual sensor 410 for determining internal neural network parameters. The neural network 440 is used for determination of the anomaly 480, 490 based on the error data 470.

In an embodiment, the neural network 440 is configured to simulate the predicted data 450, and the neural network 440 is adjusted to the sensor data 420 by means of a training function. The training function may comprise, for example, at least one of the following: Gradient descent function; Newton's method function; Conjugate gradient function; Quasi-Newton method function; and Levenberg-Marquardt function.

In an embodiment, remote normalized reference spectra files 1730n originating from a remote apparatus 1730 may be received and the convolutional autoencoder type of neural network 440 may be trained using the remote normalized reference spectra files 1730n.

In an embodiment, feedback information 496 may be gathered by an evaluation application 495 continuously. If, for example, an anomaly expert marks a period of data as irrelevant, it may be configured to disappear at the view of all other experts, so nobody need to check that period of data anymore. Then again, if a stakeholder of a case closes the cases and marks the case as highly severe, a separate model may learn this so that future similar anomalies will be more prominently indicated heatmap information 480, 490. This will lead to the experts validating the data earlier, thereby shortening the time between model output and case creation. This would benefit the stakeholders as this enables information to be available faster to them.

The insight input 495 may be received from a second apparatus (e.g. remote control apparatus) and the actual data processing and neural network involvement at a third apparatus (e.g. remote server apparatus), for example.

Figure 6:
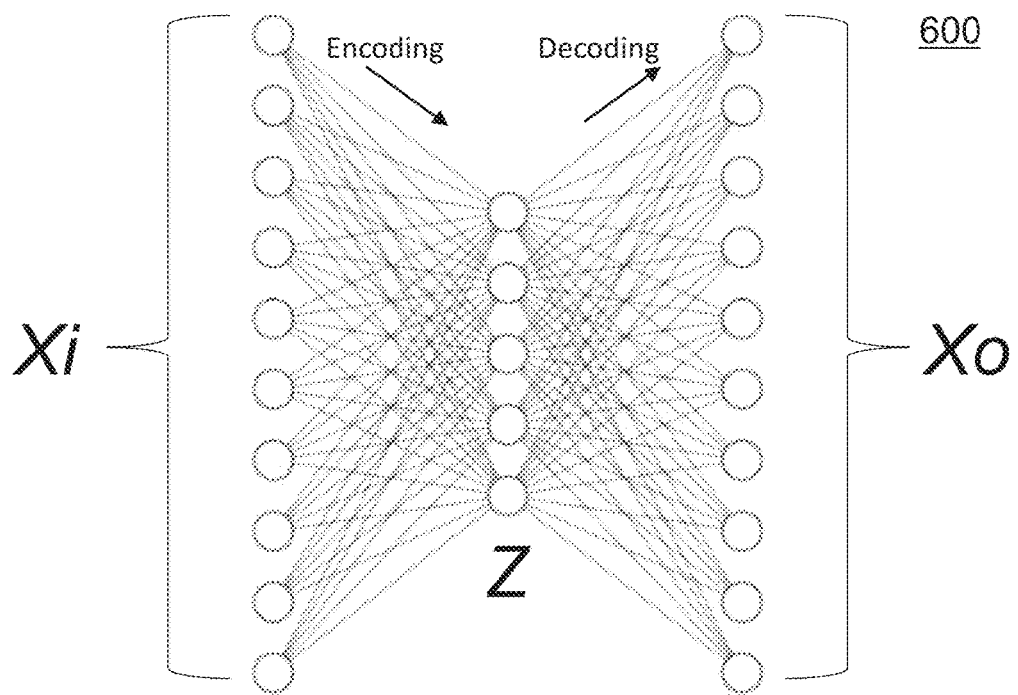
FIG. 6 shows a schematic picture of an autoencoder architecture of a neural network configured to be trained using normalized reference spectra files according to an example embodiment.

FIG. 6 shows a schematic picture of an autoencoder architecture 600 of a neural network configured to be trained using normalized reference spectra files according to an example embodiment.

Autoencoders are a class of symmetric neural networks used for unsupervised learning which learn to recreate a target. The difference with autoencoders is that the output layer is of the same dimensionality with the input layer, there is not target value in this case since the goal is to reconstruct the input without an explicit target value. Otherwise stated, the autoencoder attempts to learn the identity function by minimizing the reconstruction error. An autoencoder consists of two parts, the encoder and the decoder. The encoder is a function f that reads the input data Xi and compresses it to a latent representation usually of lower dimensionality Z.

$$z = f(x) = \sigma_f(W_f * x + b_f)$$

where f is the activation function of the encoder, Wf is the matrix or weights for the encoder, x is the input data Xi and bf is the bias vector for the encoder. Next, the decoder will read the compressed representation Z and try to recreate the input Xi with output Xo like illustrated in FIG. 6.

Accordingly, the decoder functions and output layer Xo are given by:

$$\hat{x} = t(z) = \sigma_t(W_t * z + b_t)$$

During the training phase, autoencoders attempt to find a set of parameters theta=(W, bf, bt) that will minimize the loss function L. Once again, the loss is used as a quality metric for the reconstructions. Evidently the goal is, for output Xo to be as close as possible to original input Xi.

The loss function will help the network to find the most efficient compact representation of the relations in the training data, with minimum loss. As can be seen in FIG. 6, the number of neurons in the hidden layer Z are less than those of the input layer Xi. By compressing the input, the neural network 440 (see FIGS. 4-5) will be forced to discover the relations between the input features of the training data to be able to reproduce it.

Autoencoders can also be stacked by implementing layers that compress their input, to smaller and smaller representations. After yards, similar to encoding stacked layers are used for decoding. Deep autoencoders have greater expressive power and the successive layers of representations capture a hierarchical grouping of the input, similar to the convolution and pooling operations in convolutional neural networks. Deeper autoencoders can learn new latent representations of the data, combining the ones from the previous hidden layers. Each hidden layer can be seen as a compressed hierarchical representation of the original data, and can be used as valid featured describing the input. The encoder can be considered as a feature detector that will generate a compact semantically rich representation of the input.

In its simplest form the autoencoder is a three-layer neural network like in FIG. 6. There are numerous types of autoencoders though that can be implemented depending on the problem at hand. This varies from denoising, convolutional, recurrent and most recently variational autoencoders. Choosing which type of autoencoder to apply for each problem depends on the data that is being modeled.

In the traditional architecture of autoencoders, the fact that a signal can be seen as a sum of other signals is not taken into account. Convolutional autoencoder (CAE), on the other hand, use the convolution operator to accommodate this observation. The convolution operator allows filtering an input signal to extract some part of its content. CAE learns to encode the input in a set of simple signals and then try to reconstruct the input from them. A CAE, like any autoencoder, is generally composed of two parts, corresponding to the encoder and the decoder. By transforming the input into a lower dimensional representation, the model can learn the correlation between the different data points, which in these embodiments means the spectra data. By training on normal data, without anomalies, the ADM model 400 will learn the expected behavior and patterns expected from the vibrations.

By using the reconstruction error of the autoencoder, we will be able to observe which frequencies differ significantly more than the expected and determine any potential anomalies.

Figure 7:
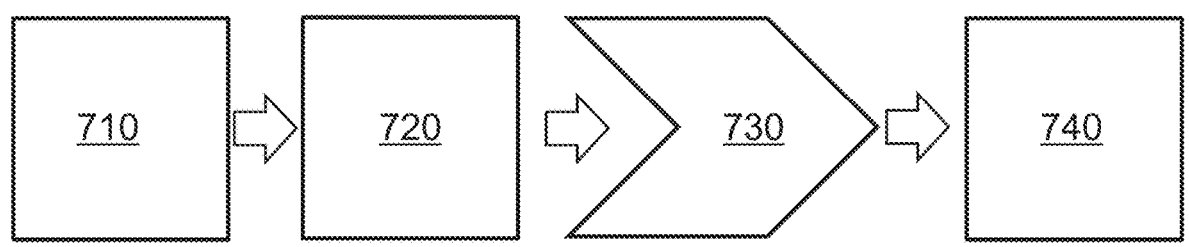
FIG. 7 shows a schematic picture of high level steps of the proposed approach according to an example embodiment.

FIG. 7 shows a schematic picture of high level steps of the proposed approach according to an example embodiment.

After data collection 710, prepossessing 720 will be applied to shape it into an appropriate form for training. Finally, after using the predictions of the autoencoder 730, the anomaly analysis 740 will take place.

Analysts often use vibration analysis to investigate a machine and monitor its status for early warnings of fault conditions. For rotating equipment this could be misaligned components, damaged bearings etc.

Vibration data may be derived by using the FFT on time domain signals collected on board a vessel, for example.

All rotating machines such as fans, motors and turbines vibrate when they are operating. As each component rotates it emits a vibration response at a certain frequency. As the speed of rotation changes, the response changes as well. All the different rotating forces within the machine cause vibration and can therefore be tracked. These forces relate to all rotating elements like the shaft, the ball within the bearing, the blades of the propeller etc.

To extract the vibration pattern from machinery, accelerometers may be used for monitoring the systems. Vibration is expressed in metric units m/s2, or in some instances, in units of gravitational constant g, where g=9.8 m/s2, The vibration in this case is the mechanical oscillation about an equilibrium position of a component. The accelerometer measures the dynamic acceleration as a voltage. For thrusters, which provide the data set of this example, the accelerometers are typically directly mounted on high frequency emitting elements, like the bearings of the electric motors. Rotations per minute (RPM) are used as the unit for the input speed of the thruster, FIG. 8 shows a schematic picture of using FFT for vibration analysis according to an example embodiment.

To illustrate how an FFT can be used for vibration analysis, an of a component may be analyzed, in this case a fan 810. The fan 810 consists of two rotating components, a shaft and the blades, each with a different frequency and amplitude. Within one rotation of the shaft, there are seven repetitions for the blades. These two parts of the fan will produce a composite waveform, also called overall vibration, that looks rather complex in the time domain. By converting the vibration to the frequency domain using an FFT, the individual sine waves can be more easily identified, as they will show up as spikes at frequencies that correspond to the rotating components.

Any composite waveform is the summation of multiple sinusoid signals of different frequencies, amplitudes, and phases. The FFT is used to deconstruct these composite complex waveforms into the individual sine wave components. The result is an amplitude function of the frequency, which allows an easier analysis in the spectrum (frequency) domain, compared to the more complicated signal of the time domain. This way it is possible to gain a deeper understanding of the vibration pattern and profile.

Figure 8:
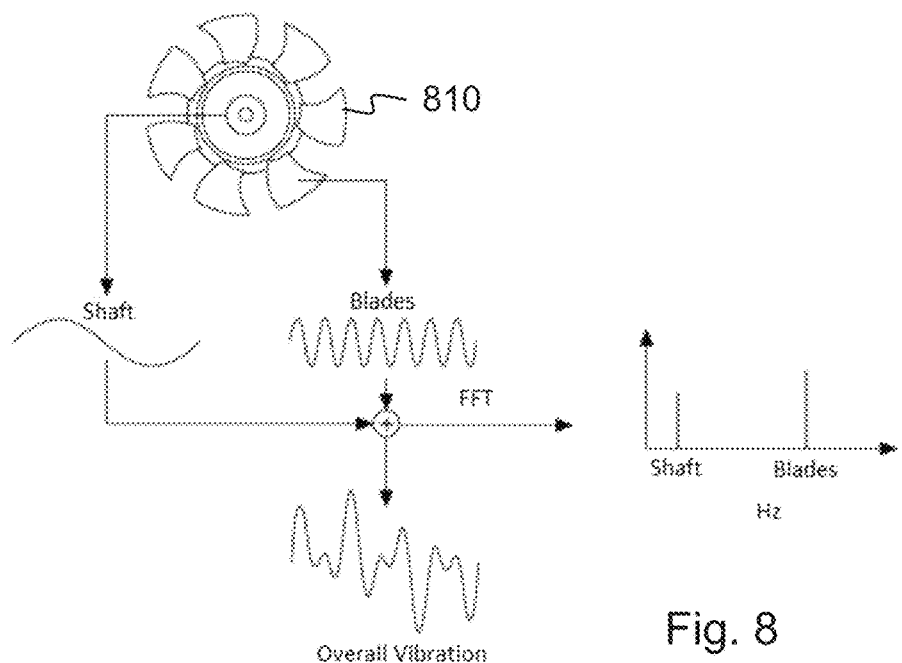
FIG. 8 shows a schematic picture of using FFT for vibration analysis according to an example embodiment.

Notice that in FIG. 8, the overall vibration signal of the fan is a combination of the vibration from the shaft and the blades. The fan rotates at a fixed RPM. The shaft rotates at the same rate as the rotational speed of the fan, whereas the rotational speed of the blades is higher than the one of the fan. The vibration signal of the shaft has the same frequency as the rotational speed of the fan, which corresponds to the first harmonic "shaft" of the right part of FIG. 8. The blade vibration signals have a higher frequency than the rotational speed of the fan, which corresponds to the vibration value.

The example of FIG. 8 is a simplistic case where the overall vibration consists of only two signals. In reality, the composite waveforms are composed of considerable more signals.

Figure 9A:
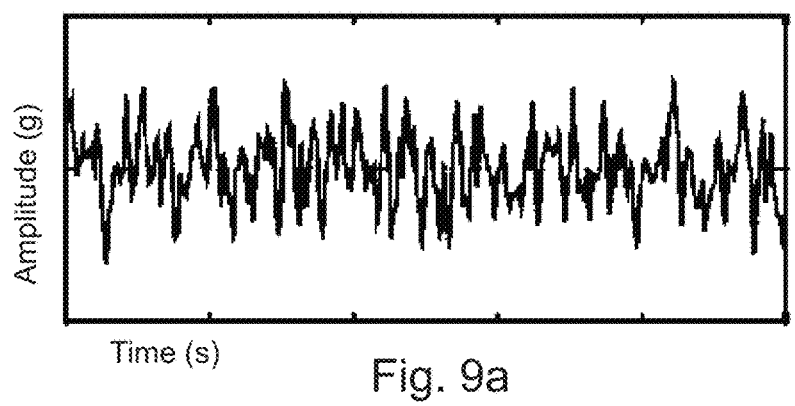
FIG. 9a shows a schematic picture of having three signals producing the timeseries according to an example embodiment.

FIG. 9a shows a schematic picture of having three signals producing the timeseries according to an example embodiment.

In FIG. 9a it can be seen how having three signals make the timeseries look more complicated. This constructed waveform is composed of three frequency components with values 22 Hz, 60 Hz and 100 Hz, with added broadband noise. This is closer to an example of a machine in real life, since we also notice noise in machinery equipment. This makes the signals hard to distinguish and is not optimal for condition monitoring in thrusters, FIG. 9a kind of waveform is too complex for visual analysis.

Figure 9B:
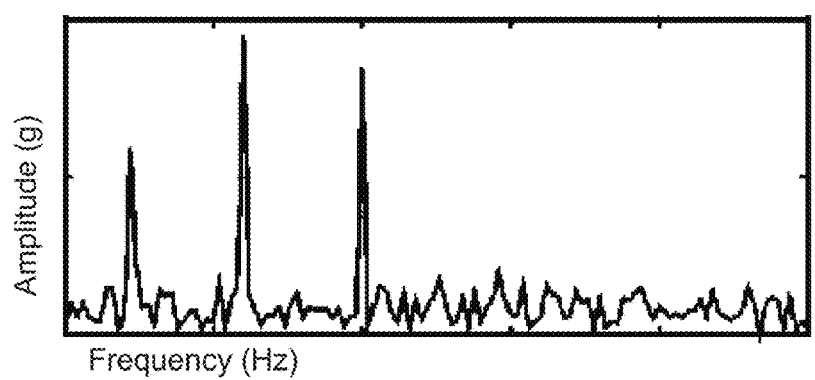
FIG. 9b shows a schematic picture of having three signals producing the frequency series after applying FFT according to an example embodiment.

FIG. 9b shows a schematic picture of having three signals producing the frequency series after applying FFT according to an example embodiment.

By using the FFT in in FIG. 9b, we can clearly distinguish the three frequency components individually at their respective frequency value (22 Hz, 60 Hz, 100 Hz). Using an FFT it is possible to clearly identify the major frequencies to determine the vibration signal. Note, that this time it is also possible to detect the added noise in the rest of the spectra, which is indicated by low amplitude signals at other frequencies.

Complex machines like thrusters produce more complicated vibration signals, from various different sources, which result in a highly complex overall vibration. In practice, machines have several more sources of vibration.

Since the goal of the analysis is to understand the condition of the machine, it is desired to assess the vibration related to the most common fault conditions of a component like misalignment, unbalance or broken bearings.

The data that is used for different embodiments consists of numerous spectra files sampled for various dates. The availability of the spectra files, is inconsistent and filtering techniques, like low pass filters are used to focus on useful information.

Each file contains, for example, 2622 different amplitude values originating from various vibrations sources, like the ones from FIG. 8. Every file available has various other information available in addition to the vibration amplitude values. This information may include, for example:

Installation information: Each file has a tag name to identify for which vessel this data has samples from.

StartTime/EndTime information (timestamp): Values corresponding to the time of the sampling process. The format may be year/month/day.

Condition: This is the input speed value in RPM, of the thruster during sampling.

Vibration amplitude: The main data used. This may of 2622 values for each file of the data set.

Figure 10A:
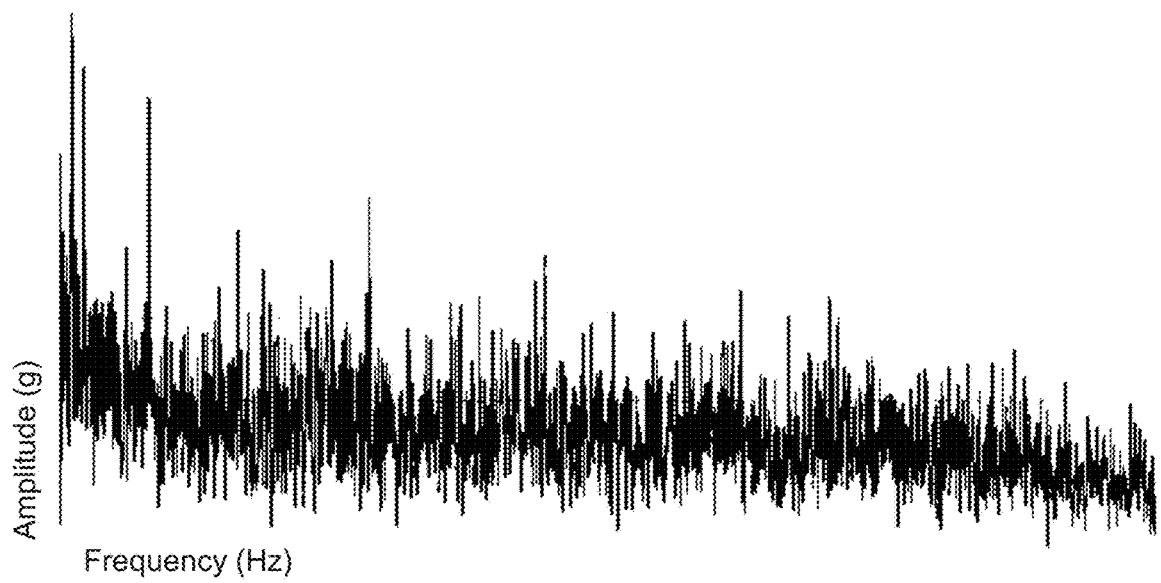
FIG. 10a shows a schematic picture of one of the spectra files plotted with respect to the corresponding frequency according to an example embodiment.

FIG. 10a shows a schematic picture of one of the spectra files plotted with respect to the corresponding frequency according to an example embodiment.

In the x-axis the corresponding frequency (0-1000 Hz) is visualized with y-axis showing the values for the corresponding amplitude (0.000-0.035 m/s2).

There are a plurality of amplitude values (2622) for the total frequency range [0-1000] Hz. This is because during the data sampling, a low-pass frequency filter is used.

On the x-axis of the file in FIG. 10a the corresponding frequency of each vibration detected by the sensors is shown. When referring to the occurrence of a repeating event it is convenient to do it in terms of multiples of running speed rather than absolute Hz. This is because of varying RPM values, which make the scale in frequency inconsistent for different files. So instead of indicating the specific frequency it is more advantageous for vibration analysis to know the frequency relative to the input speed. To achieve this, frequencies are converted into orders. It is advantageous to use orders for analysis of vibration signals, as they help with ignoring the noise of irrelevant rotating components.

If a vibration signal is equal to twice the input speed RPM from a thruster, for example, then the order is two, with the first order being the input speed rotation value. By utilizing the orders it is possible to track each individual component with more ease.

To obtain the orders we may use following equation:

Order=Frquency (Hz)*60/Input speed (RPM)

It is worth pointing out that frequency is the number of events per unit of time, so by multiplying with 60 seconds it is possible to discover the number of events per minute.

Accordingly for each individual frequency $f\_i$ for [$f\_1$, $f\_2622$], which are all the data points used for the RPM measurement for each file and calculated the new axis in orders. For example to acquire the order corresponding for an amplitude value with fi and input speed s we have equation:

$$Order\_i = f\_i * 60/s$$

where s is the input speed, for the respective file of 2622 data points, and is measure in RPM.

FIG. 10a can be used to calculate the orders for all 2662 data points. The converted x-axis, in orders, is visible in FIG. 10b, FIG. 10b shows a schematic picture of one of a spectra files after order normalization has been applied according to an example embodiment.

A spectra file after order normalization has been applied. After obtaining the orders it is easier to detect peaks corresponding to the components of interest.

The input speed for this file was 600 RPM, thus using equation for Order_i it is possible to get a maximum order value of 100. Note that the amplitudes are still the same, essentially only the x-axis labels are different.

Figure 10B:
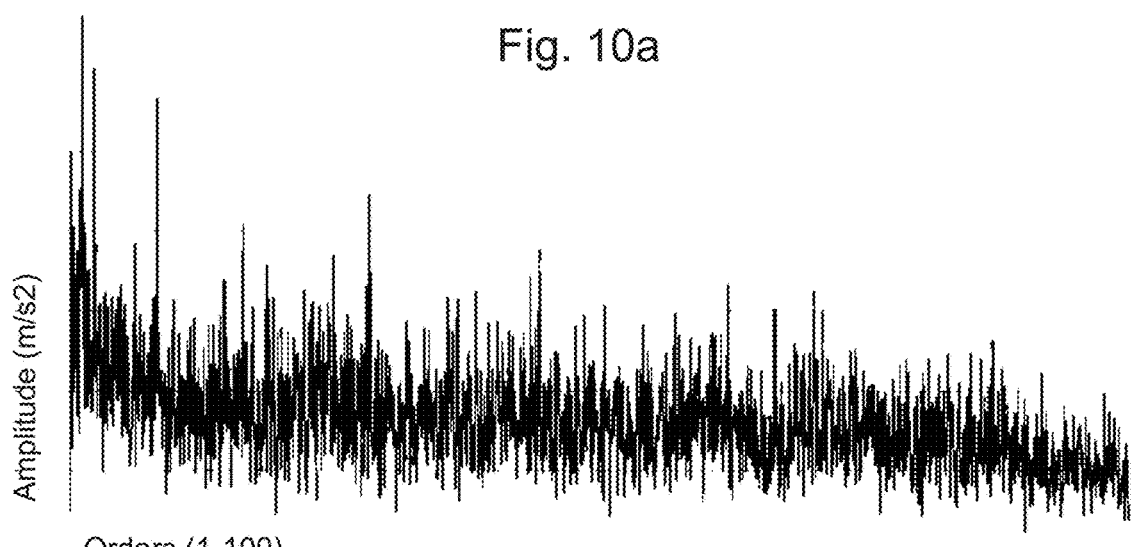
FIG. 10b shows a schematic picture of one of a spectra files after order normalization has been applied according to an example embodiment.

FIG. 10b may still seem quite complicated. Focus may be given on specific orders which correspond to parts of the thruster, for example. Usually this would amount to approximately the first 40-50 orders, for example.

To clarify the analysis of the data, the first part of the file may be analyzed like the analysts and identify what the peaks correspond to.

Figure 10C:
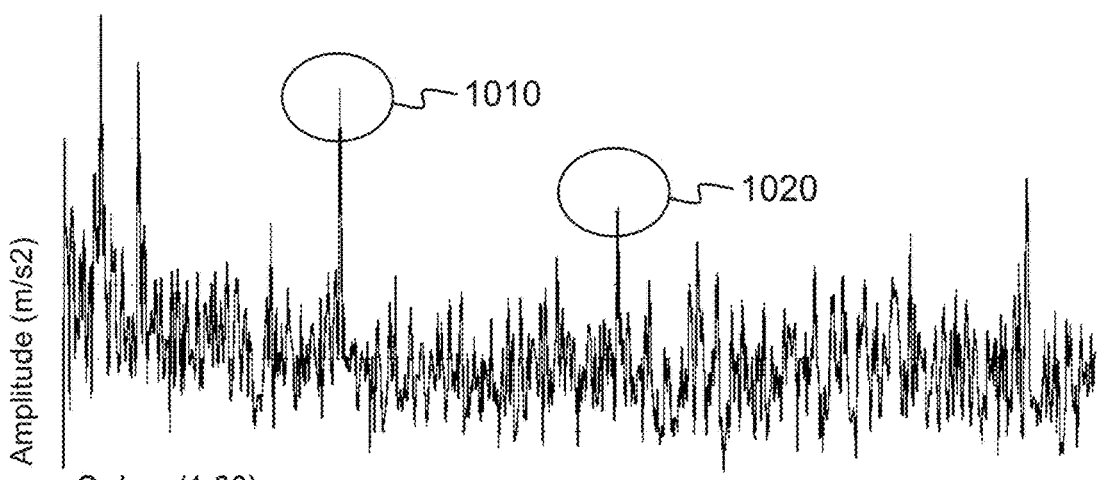
FIG. 10c shows a schematic picture of one of a spectra files for the first 30 orders according to an example embodiment.

FIG. 10c shows a schematic picture of one of a spectra files for the first 30 orders according to an example embodiment.

As shown in FIG. 10c the same file of FIG. 10b may be examined but this time focus is given on the first 30 orders. Specifically it can be noted a number of interesting peaks 1010, 1020 at first and second order. Since the orders are now used, at the first order we always have the peak at the running speed of the thruster, for example.

Using units of orders, it is therefore possible to find the source of each vibration in a more straightforward manner. At the 8th order we can see the pole pass peak 1010 rising higher than the noise floor created by the rest of the peaks. The noise floor can be thought as the horizontal line set by the majority of the peaks, in this case about 0.015 m/s2. The orders that correspond to different mechanical parts are known and they are referred to as forcing frequencies.

As can be seen in FIG. 10c, at the 16th order, the first harmonic 1020 of the pole pass frequency is visible. Harmonics are a series of evenly spaced peaks that are multiples of any forced frequency, and are common in periodic signals in vibration analysis. Locating all sets of harmonics is of great importance during the analysis process because they verify that an anomaly is present, if both the fault frequency and the first harmonic amplitudes are significantly high.

These peaks 1010, 1020 correspond to the input speed of the thruster and its first harmonic. The peaks visible at 8th order 1010 and 16th order 1020 correspond to the pole pass frequency. This is considered a common pattern for the spectra files.

As explained, the input speed of each file, measured in RPM, is utilized and thus the values for the orders are calculated. However, the thruster is operating at different speed values, when the sampling process takes place. The RPM values varies from file to file and this causes an inconsistency in the analysis of the files.

For example, an input speed of 600 RPM for the thruster will lead to maximum order of 100, while a file with input speed of 180 RPM leads to a maximum order of approximately 330. This inconsistency is caused because the file of 180 RPM is spread across a broader scale of orders while the file of 600 RPM is more compressed due to the higher thruster speed during sampling.

More clearly the effect of the fluctuating RPM on the order scale if drawing to 3D graph where on the x-axis has the orders, the y-axis has the amplitudes and z-axis showcases the RPM for the different files. Naturally, files with higher RPM values would appear more condensed than those with lower RPM. Again, it should be mentioned that the data points are still the same size for all files. Now, each measurement of the available 2622, corresponds to a different order.

This irregularity for the data is troublesome. Since the current anomaly detection is based on comparing the latest data with the old, files that are approximately of the same thruster speed are typically used. This is even more complicated if we take into consideration that the availability of data in a certain period can be low.

To solve this complication the data can be interpolated to a limited range of orders with an explicit number of new data points x_i with i belongs to {1, . . . 1600}. The number of resampled data points can be made with respect to the desired precision, necessary for the analysis of the data. After further study on data and the current analysis technique, it was found that a precision of three data points for a range of 0.1 order is appropriate.

Therefore all files are cut off at the maximum of 50 orders and then interpolated with 1600 points. xk=x1, x2, . . . , x2622→x_i=x_1, x_2, . . . , x_1600.

The new frequency orders f_i are of a fixed range with a discrete set of values needed for analysis.

By implementing a limit of 50 orders and i belonging to {1, . . . , 1600} this leads to a step of approximately 0.03 order for each data point x_i.

This is important as it solves the challenge of inconsistent data point frequency. Since we want to use an autoencoder to learn the relation between the data points, we need a fixed input space for training. However, the input speed for each file differs.

This causes the amplitude values for the first 50 orders, which are required for analysis, to be of different amounts. This effect proves problematic for the analysts, because in most instances the analysis has to be for files with almost the same input speed. This limitation is solved by using a neural network 440 (see e.g. FIG. 4 or 5).

Before training of the neural network 440, it is possible to use, for example, two different scaling methods to scale the data. This is advantageous when dealing with datasets containing varying values and ranges, like the one disclosed as an example. In cases of data features expressed in great magnitude, in deep learning (DL) it is customary to scale the data before used for the models, Minimum—Maximum Scaler The Min-Max scaling method is considered a simpler scaler. This method rescales the data in such a way that all values are in the range [0, 1]. Following function provides the rescaled data points:

$$x' = (xi - \min(x))/(\max(x) - \min(x))$$

where x' is the normalized values and x is the original value.

Robust Scaler

Robust scaler uses a similar approach to the Min-Max scaler. Instead of using the minimum and maximum vales of the data set, the robust scaler uses the interquartile ranges of the data, as noted by following function:

$$x' = (xi - Q1(x))/((Q3(x) - Q1(x))$$

where x' is the normalized values, x is the original value and Q1, Q3 are the first and third quartiles respectively. After experimenting with both scalers, robust scaler was found to provide slightly better results.

Because the robust scaler is based on quartiles it is not strongly influenced large outliers.

In an embodiment, after the data preprocessing step 720 (see e.g. prepossessing 720 in FIG. 7) is completed, the next step is to determine the neural network 440 and train on the predefined training data set. The representation learning model is a convolutional autoencoder 600 (see also e.g. element 730 in FIG. 7).

Input Layer Xi (see e.g. FIG. 6). The determined neural network 440. 600, 730 receives as an input the vibration signal files, Each file is treated as a different training example for the model. The amplitudes are processed, before used as input, with the techniques discussed earlier, namely data interpolation and scaling. The input sequence is x=(x1, x2, . . . , xn) with n=[1, 2, . . . , 1600] interpolated data points, for example. This layer serves only to define the input dimensionality of the data. In the example case of this solution it is [1, 1600] (one dimension, 1600 data points).

Convolution Layer: The convolution layer is the core of the CAE model. This is where the actual model learns the representation of the data. Input parameters include filters and kernel size. Integer values are used for the parameters which define the number of kernel windows and the size of kernel for training, respectively.

Pooling Layer: This layer reduces the input dimension size of the original data. There are different choices for pooling, with the most commonly used being Max pooling. Max pooling extracts the maximum value of a window of the feature map, similar to the convolution method, as seen in FIG. 11.

Figure 11:
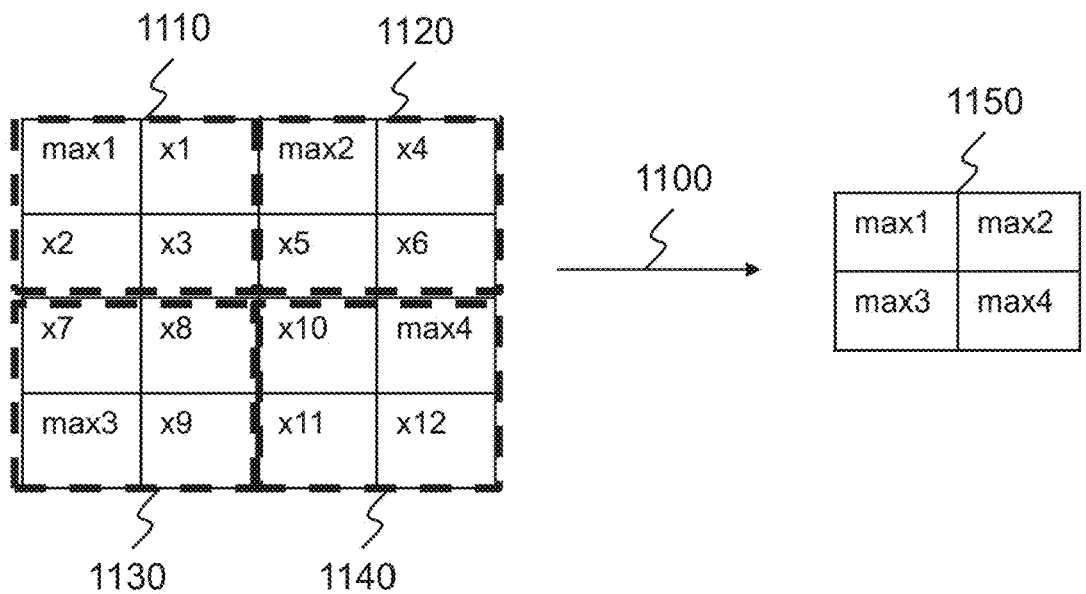
FIG. 11 shows a schematic picture of max pooling according to an example embodiment.

FIG. 11 shows a schematic picture of max pooling according to an example embodiment.

FIG. 11 illustrates an example of 2 dimensional max pooling 1100. As can be seen, for each different window 1110-1140 the maximum value is extracted.

Usually the window size, or pooling grid, used for pooling though is smaller with a typical size being 2, The neuron with the maximum activation value in the window 1110-1140 is then extracted to resulting window 1150 and the rest are discarded. Another choice for pooling is by the average method. Average pooling simply aggregates a region into the average values of the activation observed in that region.

Upsample Layer: The objective of the upsampling layer is to transform the data to the original input dimensionality, by repeating values along a certain axis.

Dropout Layer: Another important layer used is the Dropout. This technique takes as input parameter a probability p, and discards, or as the name suggests drops out, each neuron with a probability p stochastically. So then during the training of the neural network 440 these neurons will be essentially ignored from the model along with all input and output connections to other neurons. This helps prevent overfitting of the network on the training data.

In an embodiment, hyperparameter optimization may be needed to implement the neural network 440 when there is a set of parameters that we need to define. To determine the best performing set of parameters for the model, different combinations can be tested and evaluated according to the loss. The loss in this case is the main evaluation metric for the performance of the neural network, as it essentially represents the quality of the reconstructions.

It is advantageous then to aim for the lowest loss it is possible to achieve, along with respect to the quality of the reconstructions.

In an embodiment, the choice of a loss function should match the framing of the specific prediction problem. In view of the embodiments, using loss functions appropriate for regression problems should be preferred. As explained before, loss is the quantity that is minimized during the training of the neural network 440. For regression problems, like the problem of the embodiments disclosed within vibration data anomaly detection, there are a number of appropriate loss functions that can be applied.

In an embodiment, Mean Squared Error (MSE) is the default loss function for regression problems, dealing with real values. It measures the average squared difference between the predicted and target values as shown below:

$$MSE = \frac{1}{n}\sum_{i=1}^{n}(y_i - \hat{y}_i)^2$$

Similar to MSE, Mean Absolute Error (MAE) is another loss for regression models which measures the sum of absolute differences, the function is given by equation as shown below:

$$MAE = \frac{1}{n}\sum_{i=1}^{n}(|y_i - \hat{y}_i|)$$

Finally, the logarithm of the hyperbolic cosine (Logcosh) loss function my be used. Logcosh works like MSE for small differences, while for higher values it is similar to MAE. Hence, it is not strongly affected by occasional incorrect predictions as much. The function is given by equation as below:

$$\text{Logcosh} = \frac{1}{n}\sum_{i=1}^{n}\log(\cosh(y_i - \hat{y}_i))$$

After evaluating the loss functions mentioned, it was found that MSE provides the best reconstruction results. The loss also convergences, as desired for neural network 440. Both training and test loss converge, after the corresponding data sets have been through the model a sufficient number of epochs. Increasing the number of epochs more than 100 did not show any significant decrease in loss, so to avoid overfitting a maximum number of 100 epochs is used for experiments. Having a higher, than necessary, number of epochs can cause the model to overfit the training data.

In an embodiment, different activation functions can be used. The activation functions used for training comprise relu, tan h and sigmoid, for example.

The relu function is the most commonly used and recommended for feed forward neural networks, with a good performance. Relu is essentially a piece wise function of two linear pieces, and is mostly good for convolutional neural networks where the data has a topological structure.

In an embodiment, optimizer algorithms can be used to minimize the loss of the network which is dependent on the parameters that the model learns, such as the weights. Optimizers serve as the mechanism through which the network will update the weights, based on the data used as input.

For example, three optimizers could be considered. First, Adaptive Moment Estimation (Adam) is a method that computes adaptive learning rates for the model's parameters. Adam is computationally efficient and has low memory requirements. It is optimization algorithm and compares favorably to other optimizers. Second, Root Mean Square Prop (RMSProp) and third, Stochastic Gradient Descent (SGD) could also be used.

Other parameters include the number of hidden layers Z (see FIG. 6) and number of kernel filters. The number of the hidden layers Z corresponds to the depth of the model 600.

There is no general rule of thumb for the correct number of the hidden layers Z, it is dependant on the complexity of the each problem. It has been shown in studies that having unnecessarily many stacked hidden layers will cause a lower prediction accuracy. This is due to the fact that the model, having more than the sufficient number of layers, can overfit to the data set used for training, thus failing to generalize to the new unseen validation data set.

After obtaining the lowest losses, the lowest curves were selected and plotted to observe if the loss curves have converged. Afterwards, the reconstructions were observed to validate the performance of the model. It was found that actually for combinations C(3), C(4) and C(5) the model would reconstruct all data points used for test, along with simulated anomalies.

Table below shows validation loss values for different sets of hyperparameters. After obtaining the parameters with the lowest loss, the predictions are also studied to decide on the optimal combination.

| Combinations | Layers | Filters | Kernel size | Validation loss |
|---|---|---|---|---|
| C(1) | 1 | 32 | 8 | 0.0074 |
| C(2) | 1 | 8 | 8 | 0.0057 |
| C(3) | 1 | 8 | 32 | 0.0012 |
| C(4) | 1 | 32 | 32 | 0.0018 |
| C(5) | 2 | 8 | 32 | 0.0091 |

Using a high kernel size even though providing the lowest loss, was deemed not appropriate for anomaly detection due to the fact of the "mirroring" effect. This happens in cases where the autoencoder does not actually learn the data but memorizes all data points. Finally, between using 8 and 32 filters, 8 seemed to deliver better results with respect to reconstructions.

In an embodiment, it is determined parameters of the optimal model. This combination of parameters was found to be optimal combining a low converged validation loss, and valid predictions:

| | |
|---|---|
| Loss Function | MSE |
| Number of Layers | 1 |
| Optimizer | Adam |
| Kernel Size | 8 |
| Number of Filters | 8 |
| Activation Function | Relu |

The optimal set of parameters used to obtain the results is summarized in table above to provide the most efficient results with a low loss.

In an embodiment, after the parameters of the model are finalized the final step is to analyze the quality of the reconstructions.

Figure 12:
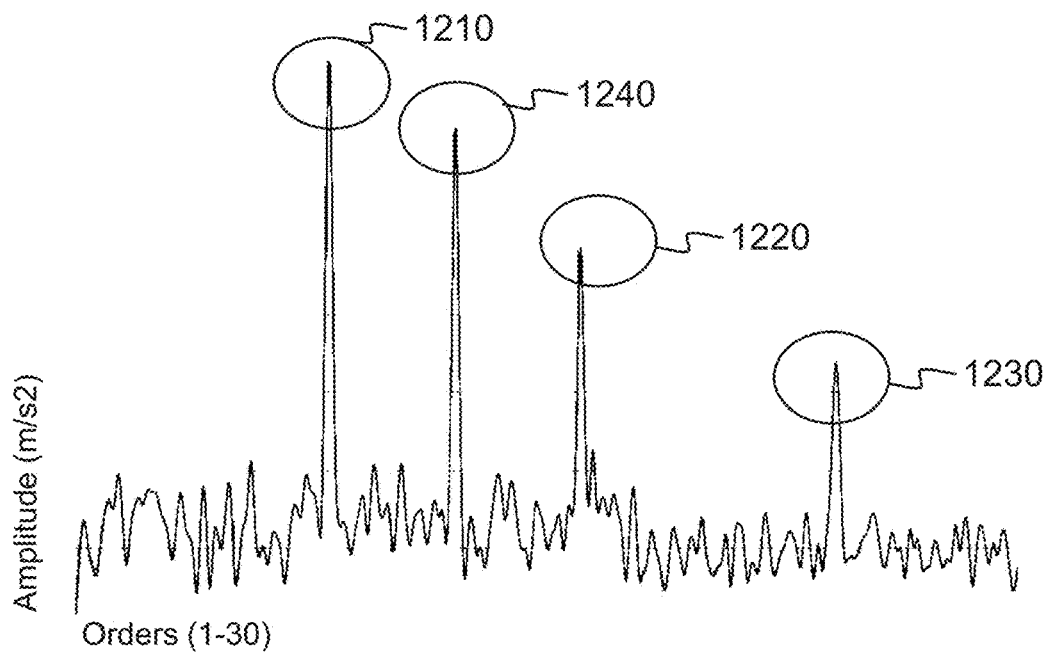
FIG. 12 shows a schematic picture of an example of a spectra file without any anomalies detected according to an example embodiment.

FIG. 12 shows a schematic picture of an example of a spectra file without any anomalies detected according to an example embodiment.

In FIG. 12 it is shown a spectra file with predictions, for the first 30 orders. High amplitudes in order 8 illustrated with a peak 1210, in order 16 illustrated with a peak 1220, and in order 24 illustrated with a peak 1230 are clearly visible and reconstructed. This is the pole pass frequency at 8th order along with the 1st and 2nd harmonic. Moreover, a vibration in 12th order illustrated with a peak 1240 is visible, this is called a ghost frequency, and does not correspond to a specific component but is not considered an anomaly either. The reconstructions are the same with the original data. This file is thus considered clean and of high quality.

Some file patterns do not imply that a thruster component is damaged, however it is data that the human analysts usually ignore and not take into account since the data points are irrelevant and do not offer valid information.

Such sampling anomalies occur in cases when the positioning of the thruster is unstable or due to overheating of the sensors.

Figure 13:
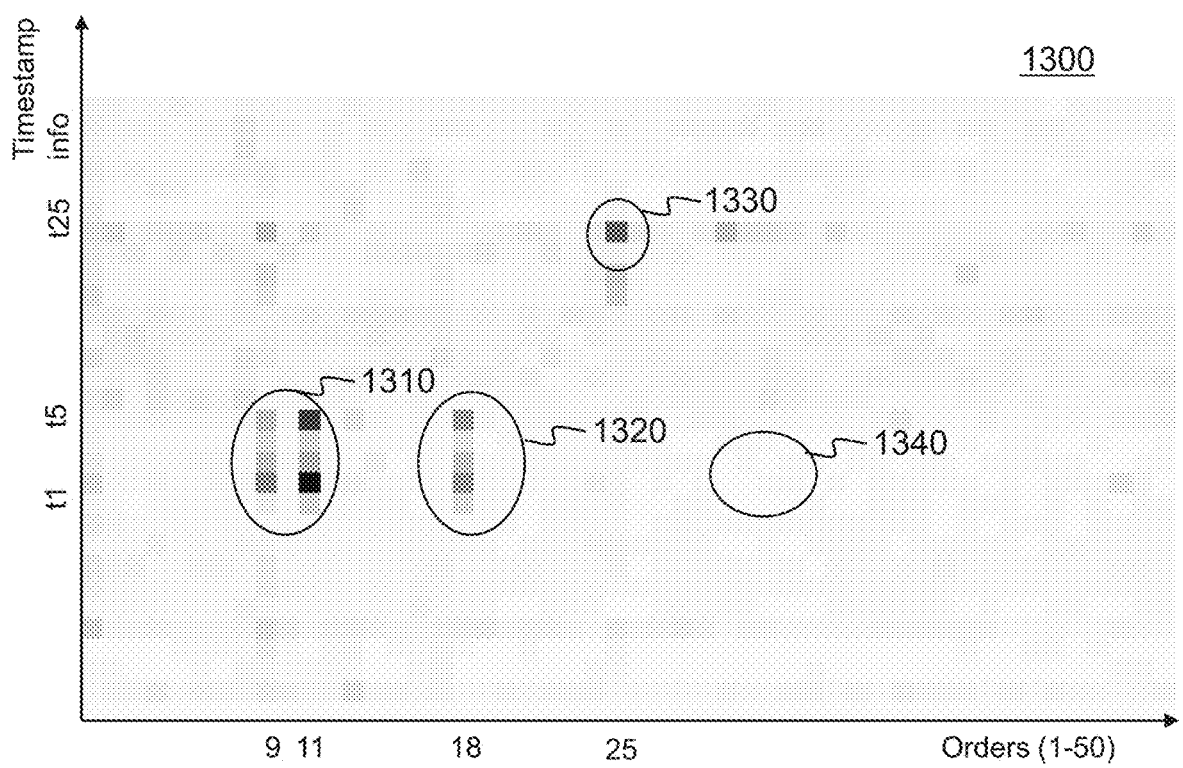
FIG. 13 shows a schematic picture of 3D heatmap according to an example embodiment.

The model 400, 600 is able to understand that these files are abnormal since the reconstructions are significantly different throughout the vibrations for all orders, FIG. 13 shows a schematic picture of 3D heatmap information 1300 for an example of a spectra file with anomalies detected according to an example embodiment.

To evaluate the performance of the solution, anomalies were simulated into the available test dataset, to observe if the model would detect them. The anomalies were created with respect to real problems that the analysts face. Specifically high vibration amplitudes were introduced at 8.6 order which represents the Ball Pass Outer Race (BPO) anomaly, and 10.4 which represents the Ball Pass Inner Race (BPI). The peaks were created for five consecutive files, in a random point of the dataset to avoid a biased evaluation.

High peaks can be observed in these orders after they were introduced in the original files used for testing, visualized in the figures to follow. The amplitude values for the anomalies were calculated according to the maximum values for each file accordingly. The anomalies were also confirmed to represent real life examples by the analysts. The orders corresponding to the anomalies are called fault frequencies. In most instances, the anomalies are confirmed where an abnormally high peak is also visible at the first harmonic of the fault frequency, hence in the case of the BPO that is order 17.2. If the analysts observe that these peaks are higher than the baseline, they deduce that an anomaly is present in the data. Anomalies for the first harmonic of the BPO were thus also simulated. For the analysis of the proposed solution, in the case of the anomalies, the goal for the model is to not reconstruct these peaks, since they are abnormal. The difference between the original signal and the reconstruction will ideally be visible and it is possible to interpret the anomalies.

In an embodiment, visualizing all individual files to detect the anomalies may prove to be unproductive, as it requires a substantial amount of time analyzing different files, To even further improve in the detection of anomalies, an anomaly heatmap 1300 may be created in which the differences of the reconstructions and the original vibrations are visualized. First color data points 1310-1320 correspond to the strongest anomaly and second color data points 1340 represent the normal data. At the x-axis of the heatmap in FIG. 13 the orders are visualized for the corresponding files while in the y-axis the timestamp information (e.g. dates) of each sample file are defined.

For each original vibration yi belonging to Ck we have following equation:

$$C_k = \max(y_i - \hat{y}_i)$$

where $\hat{y}i$ is the predicted value for original target yi and k is each cell of the heatmap. Each cell serves as the spacing between the order grid in FIG. 13. It is a configurable parameter to aid in easier and more detailed analysis.

In an embodiment, anomaly heatmap information 1300 shown in FIG. 13 is determined for 30 files. On the x-axis the orders are arranged and the respective timestamp information (e.g. dates) of the files are arranged at the y-axis. Color scale on the cells may be used to indicate the amount of difference. For example, a stronger color, such as in some cells of the area 1310, indicates a significant difference of the model prediction and original data point between timestamps t1-t5 (e.g. 5 consecutive days). The color intensity can be associated with a possibility for anomaly.

In an embodiment, based on the heatmap information 1300 it can be determined that the files corresponding to five consecutive timestamps (e.g. dates) observed by five consecutive stronger colored cells 1310, 1320 are in the orders of interest. Cells 1310 are located in orders 9 and 11 between timestamps t1 and t5 and cells 1320 are located in order 18 between timestamps t1 and t5. The model clearly indicates these data points as anomalous. A false positive 1330 is also visible at 25th order for the file of timestamp t25. During analysis though this can be ignored as it shows up on an order of no interest and is does not continue through time.

In an embodiment, after investigating the indicated anomalies from the heatmap information 1300, it is possible to analyze closer the files indicated as anomalous. Differences between original and reconstruction data may be determined. It is possible, for example, to detect for a file corresponding to timestamp t5 that the expected ghost frequency at 12th order is reconstructed in contrast with the anomalies at 8.6 10.4 and 17.2 orders.

In an embodiment, another example might be for a file that corresponds to timestamp t1 on the heatmap information 1300. Expected peaks are reconstructed while simulated anomalies are not. It could be determined that high peaks at 8th and 24th order are reconstructed and the model recognizes them as normal.

In an embodiment, in the case of the orders which represent an anomalous pattern (BPO and BPI), the corresponding cells in heatmap information 1300 are clearly highlighted with a darker colored cell. As explained, this highlight represents the difference between the original and predicted values. This difference is proven to be high when unnatural high amplitudes are present in the original data. Observing the heatmap information 1300, as the first step in the new anomaly detection procedure, it saves time since it is possible to skip a number of files that are confirmed as normal. This is a faster approach than visualizing each individual file and searching for anomalous peaks.

Figure 14:
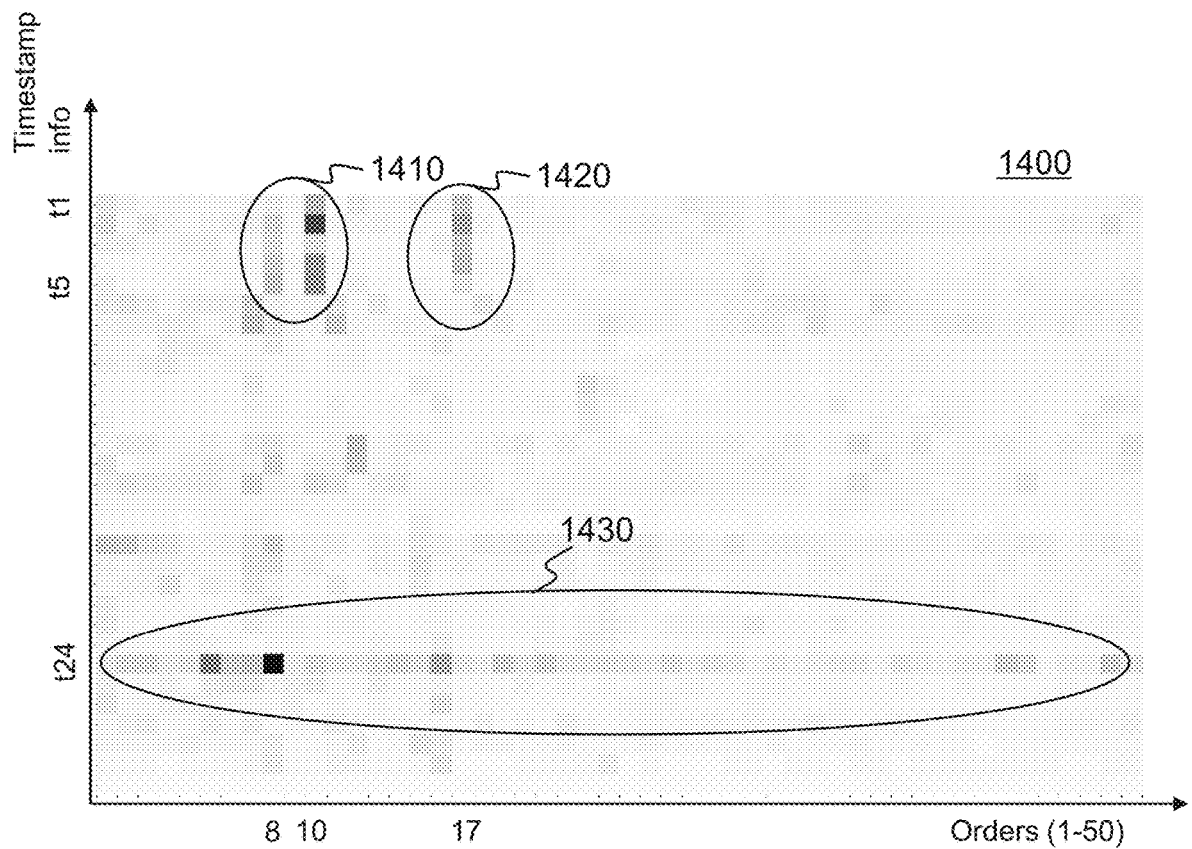
FIG. 14 shows another 3D heatmap information according to an example embodiment.

FIG. 14 shows another 3D heatmap information 1400 according to an example embodiment.

The anomalies of the five files between t1 and t5 are visible in 8th, 10th, and 17th order. This is an easy conclusion to reach, because the anomalies 1410, 1420 are present continuously throughout time, at the y-axis. This is the case when a component is broken, as the anomalies re-appear at the corresponding orders. The file of timestamp t24 is detected to also contain a number of anomalies 1430. The reconstruction-original differences seem to be present throughout the whole file of t25 however. This can be detected to be due to a low quality file, like a sampling anomaly or poor reconstructions from the model.

In some instances it was concluded that a light anomaly for the pole pass frequency of $8^{th}$ order was present. This can lead to a false positive anomaly, if we not investigated closer. This is due to the fact that the pole pass frequency (which is normal) and BPO fault frequency are both in [8-9] order cell.

In an embodiment, for the above reason a complementary heatmap information may be determined with a higher resolution, of 0.1 order, for each cell. This way it can be clearly observed for which orders there are indicated anomalies, to avoid false positives.

Figure 15:
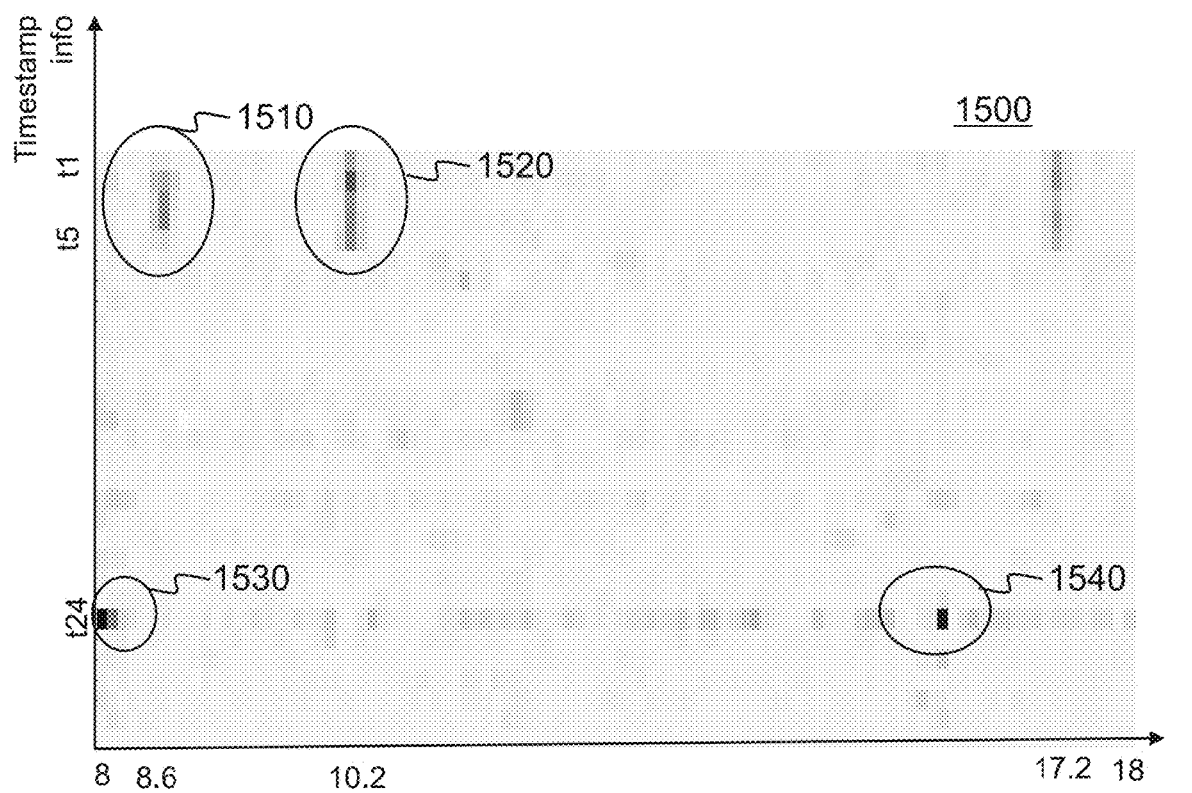
FIG. 15 shows second 3D heatmap information according to an example embodiment.

FIG. 15 shows second 3D heatmap information 1500 according to an example embodiment.

The same sub-dataset of a plurality of files (e.g. 30) is used, but this time a heatmap information 1500 of higher resolution is used, for orders 8-18. It is clearly detectable to observe the BPI and BPO anomalies 1510, 1520 exist for the first five files ranging from t1 to t5. Orders 8 and 16, representing the pole pass, are also highlighted in cells 1530, 1540 for the file of t24. By using a higher resolution, false positive anomalies, such as the pole pass frequency of 8th order, are dismissed. Peaks in the pole pass frequency are not considered anomalous and can therefore be ignored during the new analysis.

There are anomalies strongly present in the second heatmap information 1500 and that can be confirmed by the spectra file as well.

In an embodiment, a procedure followed for this subdataset, represents a clear example of how this approach can be used. First, it is investigated the first heatmap information as in FIGS. 13-14. After detecting anomaly indications, in the orders of interest, it is possible to analyze closer with the higher resolution heatmap as in FIG. 15 to avoid false positives. Using the higher resolution heatmap information 1500, it can be concluded that anomalies are present for specific fault frequencies. Last, it is possible to define anomaly indicator dates to visualize some of the spectra files as in FIG. 12, for example. By determining the specific files of interest, it is confirmed that BPI and BPO anomalies exist for a thruster, for example.

In practice, it is important to define how much training data is needed to apply effective anomaly detection using the neural network 440 based model 400, using an autoencoder model. From a practical aspect, using several years of data might not be feasible. When it comes to the training data required by the model 400, to perform on a satisfactory level, it is pragmatic to determine the magnitude of information required. If the anomalous pattern starts slowly appearing in the dataset then it is probable that the anomaly will be learned by the model 400 and hence reproduced. This might occur for cases when anomalies exist for several files, in the training dataset.

For this purpose, multiple experiments can be performed with different number of spectra files used for training. It can be found, that it is possible to perform anomaly detection according to different embodiments with just 30% of the original data to achieve positive results. To compare experiments with different amount of training data in a just way, the number of epochs was increased for experiments with less training data. Observing the loss curve, it is concluded that even 30% of the original data set suffices for training the neural network 440, with a sufficiently low validation loss score. This corresponds to approximately one to two years of data in marine vessel environment.

In an embodiment, the model 400 may be used for other vibrating machinery as well, not only thrusters. However, it is probable that the parameters of the neural network 440 will need to be modified for a different machine. The relation of the data points can be different than the patterns from thrusters.

Moreover, the reasoning behind the proposed solution is to build a model that learns the ordinary pattern of the vibrations, when no anomalies are present. Unseen observations in meaningful orders are compared with older information and thus a difference is observed in the validation dataset files. However, a normal pattern can change throughout the lifetime of equipment. The installed sensors can occasionally be replaced or even moved. This might affect the normal pattern of the data. It is therefore important that there is a process to handle such disturbance during analysis.

In an embodiment, it is worth pointing out that anomalies follow specific patterns. This effect, could be utilized also for supervised learning. If it is possible to collect a sufficient amount of specific anomalies, it is possible to deploy a model 400 for learning the various patterns and detect the anomalies by applying pattern recognition techniques. To apply this approach, there needs to be an investigation of the data for assembling sufficient datasets, of the same anomaly.

In an embodiment, the neural network 440 (see e.g. FIGS. 4-5) is trained by means of signals from the individual sensors 410 for determining internal neural network parameters.

In an embodiment, feedback information 496 may be gathered by an evaluation application 495 continuously. If, for example, an anomaly expert marks a period of data as irrelevant, it may be configured to disappear at the view of all other experts, so nobody need to check that period of data anymore. Then again, if a stakeholder of a case closes the cases and marks the case as highly severe, a separate model may learn this so that future similar anomalies will be more prominently indicated heatmap information 480, 490. This will lead to the experts validating the data earlier, thereby shortening the time between model output and case creation. This would benefit the stakeholders as this enables information to be available faster to them.

Figure 16:
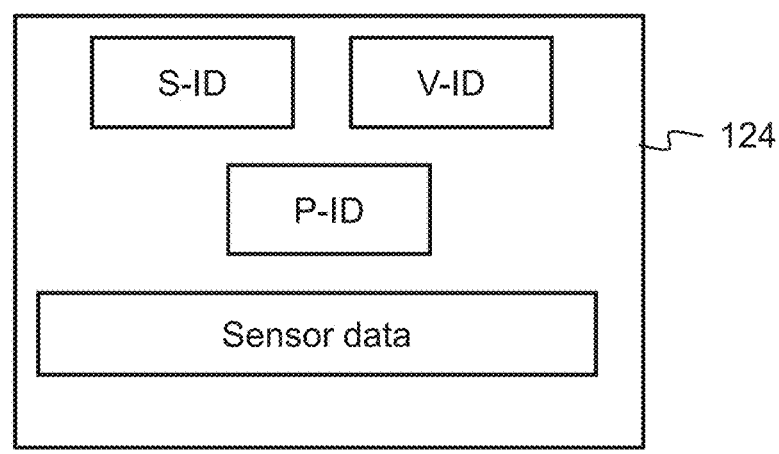
FIG. 16 shows a schematic diagram of a sensor data item in accordance with an example embodiment.

FIG. 16 shows a schematic diagram of a sensor data item 124 in accordance with an example embodiment. The sensor data item 124 as disclosed may comprise at least one identifier.

In an embodiment, the propulsion system 150 and at least one sensor device 290 (see e.g. FIG. 2) are configured to generate sensor data items based on the received identification system data and sensor data. The sensor data item may thus comprise sensor data generated by the sensor device 290 and an identifier information. The identifier information may comprise at least one of the following: sensor-ID (S-ID); propulsion-ID (P-ID), and vessel-ID (V-ID) that may comprise at least part of the received automatic identification system (AIS) data, for example.

A sensor data item, such as propulsion vibration parameters 124, is generated by a sensor device of the marine vessel 105 (see FIG. 1) and transmitted to control apparatus 120 and/or remote server apparatus 1730 (see FIG. 17 or 18) as input data for the anomaly detection model (ADM) 121, 400. Sensor data items may be processed at the control apparatus 120 or server apparatus 1730 before inputting to ADM or transmitting to the server apparatus or they may be inputted or sent without further processing.

Figure 17:
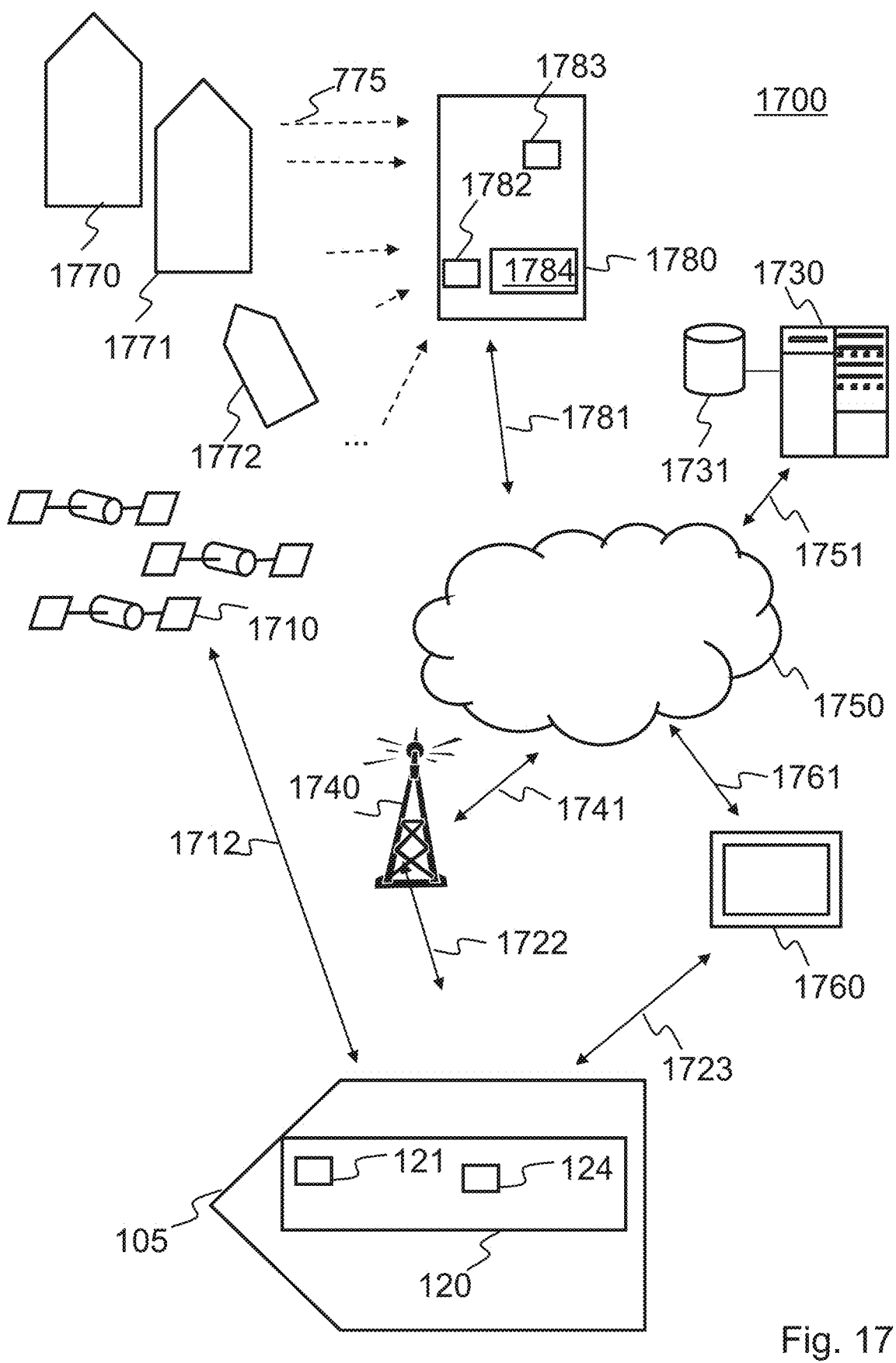
FIG. 17 shows a schematic picture of a system according to an example embodiment.

FIG. 17 shows a schematic picture of a system 700 according to an example embodiment. A marine vessel 105 may comprise a control apparatus 120, for example, Instead of a marine vessel, the entity 105 may comprise any setup utilizing an operating data system with a plurality of sensors operationally connected thereto for measuring vibration data.

As an example, a marine vessel 105 is discussed. The marine vessel 105 comprises the control apparatus 120 comprising means for generating, processing and transceiving vibration related data through a communication interface, for example. The apparatus 120 is capable of downloading and locally executing software program code. The software program code may be a client application of a service whose possible server application is running on a server apparatus 1730, 731 of the system 1700. The marine vessel 105 comprises at least one sensor operationally connected to a vibration source to provide sensor data 124. The apparatus 120 is configured to receive the sensor data 124 and process the data utilizing neural network and anomality detection model (ADM) 121, 400 (see FIG. 4). The ADM 121, 400 may be operated at a server apparatus 1730 or at local apparatus 120. The apparatus 120 may further comprise a capturing device, such a sensor device, for providing operational or environmental data relating to the marine vessel 105 for providing such data as further input to the ADM 121, 400 and neural network, for example. The sensor device may comprise an accelerometer or a gyroscope, for example. There may be a plurality of sensors that comprises a first sensor measuring vibration of a propulsion shaft and a second sensor measuring vibration of a propeller blade, for example.

In an embodiment, there is provided a computer implemented method in a marine vessel data system, the method comprising: receiving data from at least one sensor configured to measure vibration and operationally arranged to the marine vessel to provide time-domain reference sensor data; maintaining the time-domain reference sensor data within a data storage system; generating a Fast Fourier Transform (FFT) on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data; normalizing each reference spectra file by converting the frequency information to order information using the condition information to provide normalized reference spectra files; and training a convolutional autoencoder type of neural network using the normalized reference spectra files.

In an embodiment, at least one reference vessel 1770-1772 is configured to generate reference profile data 1782 by determining reference vessel parameters 1775 of the reference vessel 1770-1772. At least one reference vessel 1770-1772 is configured to generate reference sensor data 1783 based on sensors operationally connected to the reference vessel 1770-1772. Reference vessel 1770-1772 related measurements, data collection and transceiving may be carried out by a reference data apparatus 1780. A reference anomaly detection model 1784 may be generated based on the reference profile data 1782 and the sensor data 1783. The profile data 1782 may comprise, for example, operational or environmental characteristics, service data, oil measurement data, spare part data, service provider manual input data etc. of the reference vessels 1770-1772.

The reference anomaly detection model 1784 may be transmitted to a server apparatus 1730, 1731 for storing and processing over connection 1781. The reference profile data 1782 and/or the reference sensor data 1783 may also be transmitted to a server apparatus 1730, 731 for storing and processing. The reference anomaly detection model 1784 may also be generated at the server apparatus 1730, 1731.

In an embodiment, reference profile data 1782, engine sensor data 1783 or the reference anomaly detection model 1784 may be configured to be received at a control apparatus 120 that may comprise a propulsion system operated in the marine vessel 105, for example. At the apparatus 120, sensor data 124 are received of the marine vessel 105, and anomality detection may be performed by selecting optimal model between the reference model 1784 and the model 121, 400 (see FIG. 4), as well as by selecting between the sensor data 124 and the reference profile data 1782 with the reference sensor data 1783.

In an embodiment, local operational or environmental parameters may be determined at the marine vessel 105 to define which sensor data 124 is used for the ADM 121, 400, In case the circumstances of the marine vessel 105 are such that there is not reliable history data to be used for the ADM 121, 400 (see FIG. 4), reference sensor data 1783 may be used as history data for the ADM 121, 400. Same applies if the environmental or operational parameters change and better environmental data associated with sensor data can be received from the reference vessels 1770-1772. The reference profile data 1782 may be configured to associate reference sensor data 1783 to the operational (load, speed, service time, operating hours) and environmental (temperature, pressure, wind, humidity, wave height) circumstances and to assist the selection of the most appropriate reference data 1783 to be used for the ADM 121, 400 (see FIG. 4) eventually.

In an embodiment, an ADM 400 (see e.g. FIG. 4) may be operated at remote server 1730 and configured to receive reference data 1782-1784 from a remote apparatus 1780 comprising a plurality of reference sensors operationally arranged to a reference marine vessel 1770-1772 to provide reference sensor data, determine reference historical data based on the reference sensor data; and provide the reference historical data as input to the neural network 440 (see FIG. 4). Reference data may be received from a plurality of remote apparatuses each comprising a plurality of reference sensors to provide reference sensor data. The reference data may relate to different operational conditions of the reference vessel 1770-1772, The reference data may relate to operational and environmental measurement data of the reference vessel. Furthermore, reference data may be maintained at a server apparatus 1730, and the reference historical data may be dynamically updated based on the reference sensor data, and the reference historical data may be provided as input to the neural network 440 (see FIG. 4).

In the present description, by vessel are meant any kinds of waterborne vessels, typically marine vessels, Most typically the vessel is a cargo ship or large cruise vessel, but the present disclosure is also applicable for yachts, for example.

The control apparatus 120 is configured to be connectable at least occasionally to a public network 1750, such as Internet, directly via local connection or via a wireless communication network 1740 over a wireless connection 1722. The wireless connection 1722 may comprise a mobile cellular network, a satellite network or a wireless local area network (WLAN), for example. The wireless communication network 1740 may be connected to a public data communication network 1750, for example the Internet, over a data connection 1741, The control apparatus 120 may be configured to be connectable to the public data communication network 1750, for example the Internet, directly over a data connection that may comprise a fixed or wireless mobile broadband access. The wireless communication network 1740 may be connected to a server apparatus 1730 of the system 1700, over a data connection.

In an embodiment, the control apparatus 120 may set up local connections within the marine vessel 105 with at least one capturing device, such as a sensor, and a computer device. The capturing device, such as a sensor, may be integrated to the control apparatus 120, to a propulsion system or to the marine vessel 105, attached to the hull of the marine vessel 105 and connected to the vessel control system or arranged as separate sensor device and connectable over separate connection.

The control apparatus 120 and its client application may be allowed to log into a vessel or propulsion data service run on a server 1730, for example.

Real-time interaction may be provided between the control apparatus 120 and the server 1730 to collaborate for marine vessel data and ADM 121, 400 (see FIG. 4), over a network 1750, Real-time interaction may also be provided between the apparatus 120 and the remote user device 1760 to collaborate for marine vessel or vibration data over a network 1750, 1761.

A sensor data item, such as vibration parameters 124, is generated by a sensor device of the marine vessel 105 and transmitted to the control apparatus 120 and/or to the server 1730. Sensor data items may be processed at the apparatus 120 before transmitting or they may be sent without further processing. Sensor data may also be stored within the control apparatus 120 before transmission over the network 1750. Then again, transmitted sensor data may be stored/and or processed at the server apparats 1730 or at the remote user device 1760.

A capturing device (e.g. a sensor device) may capture and send sensor data as a real-time content or non-real time data to the server apparatus 1730 or to the remote user device 1760 over a peer-to-peer connection formed over network, for example.

The control apparatus 120 may be connected to a plurality of different capturing devices and instruments and the apparatus 120 may be configured to select which sensor device(s) is actively collaborated with.

The user of the control apparatus 120 or the remote user device 1760 may need to be logged in with user credentials to a chosen service of the network server 1730.

In an embodiment, the system 1700 comprises a sensor device configured to be comprised by or connectable to the control apparatus 120 over a local connection. The local connection may comprise a wired connection or a wireless connection. The wired connection may comprise Universal Serial Bus (USB), High-Definition Multimedia Interface (HDMI), or RCA interface, for example. The wireless connection may comprise acoustic connection, Bluetooth™, Radio Frequency Identification (RF-ID) or wireless local area network (WLAN), for example. Near field communication (NFC) may be used for sensor device identification between the sensor device and the control apparatus 120, for example.

A sensor device may also be connected directly to the public network 1750, such as Internet, via direct local connection or via a wireless cellular network connection 1740, 1741.

In an embodiment, the system 1700 may comprise a server apparatus 1730, which comprises a storage device 1731 for storing service data, service metrics and subscriber information, over data connection 1751. The service data may comprise configuration data; account creation data; sensor data; sensor ID's; reference data items; anomaly detection model related data; user input data; real-time collaboration data; reference vessel profile data; reference vessel parameters; predefined settings; and attribute data, for example.

In an embodiment, a proprietary application in the control apparatus 120 may be a client application of a service whose server application is running on the server apparatus 1730 of the system 1700.

In an embodiment, configuration information or application download information for any apparatus may be automatically downloaded and configured by the server 1730. Thus, the user of the devices may not need to do any initialization or configuration for the service. The system server 1730 may also take care of account creation process for the service, sensor devices, apparatuses and users.

In an embodiment, the association of the devices can be one-time or stored persistently on any of the devices or the server 1730.

In an embodiment, authentication of a sensor device or control apparatus 120 on a system server 1730 may utilize hardware or SIM credentials, such as International Mobile Equipment Identity (IMEI) or International Mobile Subscriber Identity (IMSI). The sensor device or control apparatus 120 may transmit authentication information comprising IMEI and/or IMSI, for example, to the system server 1730. The system server 1730 authenticates the device or control apparatus 120 by comparing the received authentication information to authentication information of registered users/devices/vessels/apparatuses stored at the system server database 1731, for example. Such authentication information may be used for pairing the devices and/or apparatuses to generate association between them for a vessel or power plant data connection.

In an embodiment, a service web application may be used for configuration of a system. The service web application may be run on any user device, admin device, or a remote control device 1760, such as a personal computer connected to a public data network, such as Internet 1750, for example. The remote control apparatus 1760 may also be connected locally to the control apparatus 120 over a local connection 1723 and may utilize the network connections of the apparatus 120 for configuration purposes. The service web application of the remote apparatus 1760 may provide searching/adding instruments, determining attributes, device setup and configuration, for example. The service web application of the remote apparatus 1760 may be a general configuration tool for tasks being too complex to be performed on the user interface of the control apparatus 120, for example.

In an embodiment, a remote control apparatus 1760 may be authenticated and configuration data sent from the control apparatus 1760 to the system server 1730, 1731, wherein configuration settings may be modified based on the received data. In an embodiment, the modified settings may then be sent to the control apparatus 120 over the network 1750 and the local connection or the wireless operator. The modified settings may also be sent to external devices correspondingly, through the control apparatus 120 or directly over the network 1750, for example.

In an embodiment; the sensor device may be wireless or wired.

The system 1700 may also comprise a plurality of satellites 1710 in orbit about the Earth. The orbit of each satellite 1710 is not necessarily synchronous with the orbits of other satellites and, in fact, is likely asynchronous. A global positioning system receiver apparatus such as the ones described in connection with preferred embodiments of the present invention is shown receiving spread spectrum global positioning system (GPS) satellite signals 1712 from the various satellites 1710. The plurality of satellites 1710 may be used for location purposes, input for determining traveled distance (since oil change or part change, for example), or input for accurate time (since oil/part change, for example).

The remote control apparatus 1760 may be configured to be operated by a remote operator of the vessel 105. The remote control apparatus 1760 may be arranged on a ground station, on the vessel 105 or on another vessel, for example.

Figure 18:
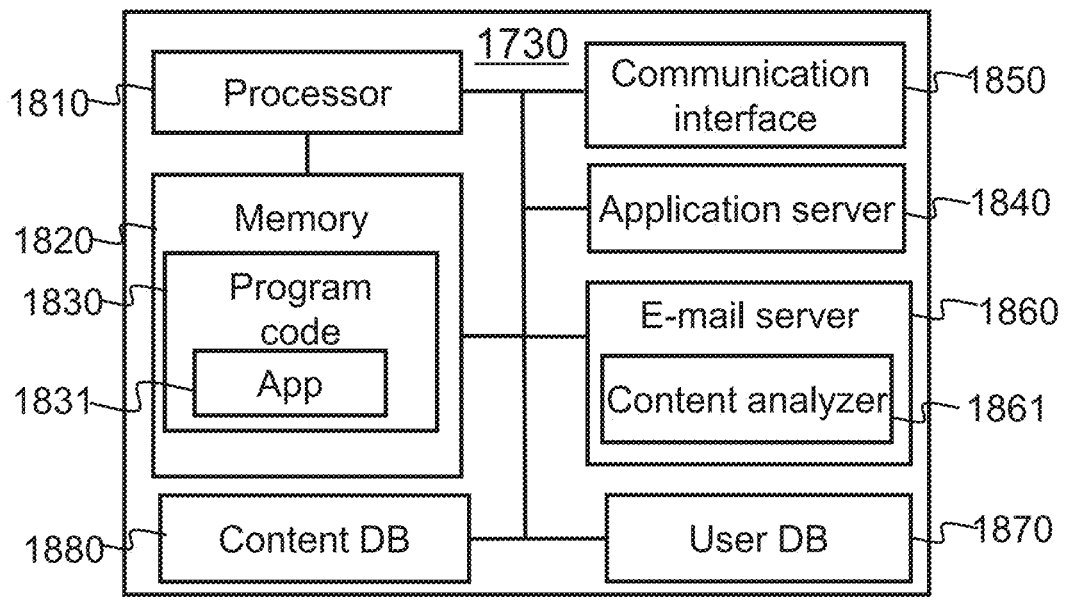
FIG. 18 presents an example block diagram of a server apparatus in which various embodiments of the invention may be applied.

FIG. 18 presents an example block diagram of a server apparatus 1730 in which various embodiments of the invention may be applied.

The general structure of the server apparatus 1730 comprises a processor 1810, and a memory 1820 coupled to the processor 1810. The server apparatus 1730 further comprises software 1830 stored in the memory 1820 and operable to be loaded into and executed in the processor 1810. The software 1830 may comprise one or more software modules, such as service application 1831 and can be in the form of a computer program product. The software 1830 may comprise the anomaly detection model (ADM) 121, 400 and the service application 1831 may be configured to communicate with the client application arranged at control apparatus 120, for example. The client application may be configured to provide the sensor data from the marine vessel data system to the ADM model 400, 1830, for example.

The processor 1810 may be, e.g., a central processing unit (CPU), a microprocessor, a digital signal processor (DSP), a graphics processing unit, or the like. FIG. 18 shows one processor 1810, but the server apparatus 1730 may comprise a plurality of processors.

The memory 1820 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 1730 may comprise a plurality of memories. The memory 1820 may be constructed as a part of the server apparatus 1730 or it may be inserted into a slot, port, or the like of the server apparatus 1730 by a user. The memory 1820 may serve the sole purpose of storing data, or it may be constructed as a part of an apparatus serving other purposes, such as processing data.

The communication interface module 1850 implements at least part of radio transmission. The communication interface module 1850 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution), or 5G radio module. The wired interface may comprise such as universal serial bus (USB) or National Marine Electronics Association (NMEA) 0183/2000 standard for example. The communication interface module 1850 may be integrated into the server apparatus 1730, or into an adapter, card or the like that may be inserted into a suitable slot or port of the server apparatus 1730. The communication interface module 1850 may support one radio interface technology or a plurality of technologies. Captured data associated with environmental data of the marine vessel 105, as well as measured parameters relating to operation conditions of the vessel may be received by the server apparatus 1730 using the communication interface 1850.

The e-mail server process 1860, which receives e-mail messages sent from control apparatuses 120, such as marine vessel, and remote computer apparatuses 1760 via the network 1750. The server 1860 may comprise a content analyzer module 1861, which checks if the content of the received message meets the criteria that are set for new activity data item of the service. The content analyzer module 1861 may for example check whether the e-mail message contains a valid activity data item to be used as reference data item. The valid reference data item received by the e-mail server is then sent to an application server 1840, which provides application services e.g. relating to the user accounts stored in a user database 1870 and content of the content management service. Content provided by the service system 1700 is stored in a content database 1880.

A skilled person appreciates that in addition to the elements shown in FIG. 18, the server apparatus 1730 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Not all elements disclosed in FIG. 18 are mandatory for all embodiments.

According to an embodiment, the server apparatus 1730 may receive selection information for a plurality of reference vessels and generate the reference profile data by determining reference parameters of the plurality of reference vessels based on the selection information. The reference parameters may be generated based on sensor data received from at least one reference vessel. The reference parameters may relate to different operation conditions of the reference vessel.

In an embodiment, a reference engine data apparatus 1780 (see FIG. 17) may be configured to determine the reference vessel sensor data, reference environmental data, and reference operational data, and generate reference model based on the reference inputs.

The reference model data of the reference model 1784 may be maintained at a server apparatus 1730, and dynamically updated in response to receiving updated reference vessel data.

The remote computer apparatus 1760 may comprise similar structure as the control apparatus 120 of FIG. 2 but optionally without the sensor devices 260, 290 and GPS.

Figure 19:
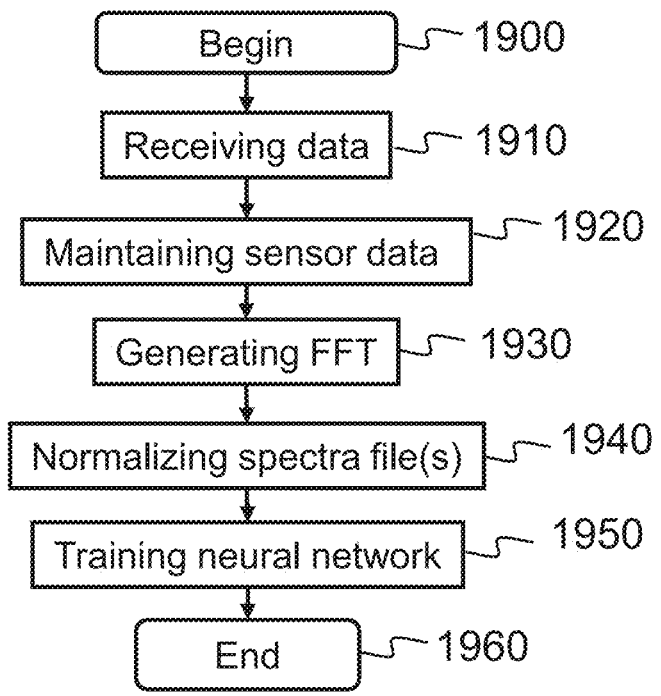
FIG. 19 shows a flow diagram showing operations in accordance with an example embodiment of the invention.

FIG. 19 shows a flow diagram showing operations in accordance with an example embodiment of the invention. In step 1900, the method in a marine vessel data system is started.

In step 1910, data is received from at least one sensor configured to measure vibration and operationally arranged to the marine vessel to provide time-domain reference sensor data. In step 1920, the time-domain reference sensor data is maintained within a data storage system. In step 1930, a Fast Fourier Transform (FFT) is generated on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data. In step 1940, each reference spectra file is normalized by converting the frequency information to order information using the condition information to provide normalized reference spectra files. In step 1950, a convolutional autoencoder type of neural network is trained using the normalized reference spectra files. The method is ended in step 1960.

Without in any way limiting the scope, interpretation, or application of the claims appearing below, a technical effect of one or more of the example embodiments disclosed herein is an improved system for a control apparatus or an engine apparatus.

A technical effect of one or more of the example embodiments disclosed herein is that marine vessel performance is improved. A technical effect of one or more of the example embodiments disclosed herein is that efficiency of a vessel is improved. A further technical effect of one or more of the example embodiments disclosed herein is that operational efficiency of a propulsion system, is improved. Another technical effect of one or more of the example embodiments disclosed herein is that possible faults or malfunctions are detected early enough to avoid any major break of marine vessel elements. Still another technical effect of one or more of the example embodiments disclosed herein is that amount of false anomalies is minimized.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications that may be made without departing from the scope of the present invention as defined in the appended claims.

The invention claimed is:

1. A computer implemented method in a marine vessel data system, the method comprising:
   receiving data from at least one sensor configured to measure vibration and operationally arranged to the marine vessel to provide time-domain reference sensor data;
   maintaining the time-domain reference sensor data within a data storage system;
   generating a Fast Fourier Transform (FFT) on the time-domain reference sensor data to provide a plurality of reference spectra files in frequency-domain, wherein each reference spectra file comprises spectra data defined by amplitude information and frequency information, and each spectra file is associated with condition information determined based on collection of the time-domain reference sensor data;
   normalizing each reference spectra file by converting the frequency information to order information using the condition information to provide normalized reference spectra files; and
   training a convolutional autoencoder type of neural network using the normalized reference spectra files.

2. The method of claim 1, wherein the at least one sensor is configured to measure vibration of a component installed to the marine vessel.

3. The method of claim 2, wherein the at least one sensor comprises an accelerometer.

4. The method of claim 2, wherein the at least one sensor is configured to measure vibration of a propulsion system comprising a plurality of operationally connected parts.

5. The method of claim 1, wherein the condition information comprises rotations per minute (RPM) information.

6. The method of claim 1, wherein the spectra data comprises data points configured to determine the amplitude information as a function of the frequency information or the order information.

7. The method of claim 6, wherein each data point is associated with the condition information according to the condition information associated to the spectra file.

8. The method of claim 1, further comprising:
   resampling at least one normalized reference spectra file by interpolating the spectra data to a sub-range of the order information to provide resampled reference spectra file; and
   training the convolutional autoencoder type of neural network based on the resampled reference spectra file.

9. The method of claim 8, wherein the resampled reference spectra file comprises resampled data points with total number smaller than data points before resampling.

10. The method of claim 9, wherein resampling rate is configured to be three data points for a range of 0.1 order information.

11. The method of claim 8, wherein the spectra data is limited to first 50 orders as the sub-range of the order information, and interpolating is configured to determine 1600 data points.

12. The method of claim 1, further comprising:
   scaling at least one normalized reference spectra file by scaling the spectra data to a sub-range of the amplitude information to provide scaled reference spectra file; and
   training the convolutional autoencoder type of neural network based on the scaled reference spectra file.

13. The method of claim 12, wherein the sub-range of the amplitude information is configured to be [0, 1].

14. The method of claim 1, wherein the convolutional autoencoder type of neural network is arranged at a remote server apparatus.

15. The method of claim 1, wherein the neural network is trained by means of signals from at least one sensor for determining internal neural network parameters.

16. The method of claim 1, wherein the training is configured to utilize a training function that comprises at least one of the following:
   Gradient descent function;
   Newton's method function;
   Conjugate gradient function;
   Quasi-Newton method function; and
   Levenberg-Marquardt function.

17. The method of claim 1, further comprising:
   receiving remote normalized reference spectra files originating from a remote marine vessel apparatus; and
   training the convolutional autoencoder type of neural network using the remote normalized reference spectra files.

18. The method of claim 1, wherein the at least one sensor is limited to a plurality of sensors.

19. A server apparatus in a marine vessel data system, comprising:
   a communication interface;
   at least one processor; and
   at least one memory including computer program code;
   the at least one memory and the computer program code configured to, with the at least one processor, cause the apparatus to:
      receive data from at least one sensor configured to measure vibration and operationally arranged to the marine vessel to provide time-domain reference sensor data;
      maintain the time-domain reference sensor data within a data storage system;
      generate a Fast Fourier Transform (FFT) on the time-domain reference sensor data to provide a plurality of reference spectra files in frequency-domain, wherein each reference spectra file comprises spectra data defined by amplitude information and frequency information, and the spectra file is associated with condition information determined based on collection of the time-domain reference sensor data;

normalize each reference spectra file by converting the frequency information to order information using the condition information to provide normalized reference spectra files; and train a convolutional autoencoder type of neural network using the normalized reference spectra files.

20. A computer program stored on a non-transitory computer readable medium comprising computer executable program code, which code, when executed by at least one processor of an apparatus, causes the apparatus to:

receive data from at least one sensor configured to measure vibration and operationally arranged to the marine vessel to provide time-domain reference sensor data;

maintain the time-domain reference sensor data within a data storage system;

generate a Fast Fourier Transform (FFT) on the time-domain reference sensor data to provide a plurality of reference spectra files in frequency-domain, wherein each reference spectra file comprises spectra data defined by amplitude information and frequency information, and the spectra file is associated with condition information determined based on collection of the time-domain reference sensor data;

normalize each reference spectra file by converting the frequency information to order information using the condition information to provide normalized reference spectra files; and train a convolutional autoencoder type of neural network using the normalized reference spectra files.

* * * * *